United States Patent
Kim

(10) Patent No.: US 12,501,348 B2
(45) Date of Patent: Dec. 16, 2025

(54) METHOD AND APPARATUS FOR TRANSMITTING SIGNAL IN WIRELESS COMMUNICATION SYSTEM

(71) Applicant: LG ELECTRONICS INC., Seoul (KR)

(72) Inventor: Hyunmin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 421 days.

(21) Appl. No.: 18/003,564

(22) PCT Filed: Jul. 19, 2021

(86) PCT No.: PCT/KR2021/009275
§ 371 (c)(1),
(2) Date: Dec. 28, 2022

(87) PCT Pub. No.: WO2022/019593
PCT Pub. Date: Jan. 27, 2022

(65) Prior Publication Data
US 2023/0276346 A1    Aug. 31, 2023

(30) Foreign Application Priority Data

Jul. 20, 2020   (KR) .................. 10-2020-0089744
Nov. 20, 2020   (KR) .................. 10-2020-0156892

(51) Int. Cl.
*H04W 48/10*     (2009.01)
*H04L 1/1812*    (2023.01)
(Continued)

(52) U.S. Cl.
CPC ........... *H04W 48/10* (2013.01); *H04L 1/1812* (2013.01); *H04W 56/0045* (2013.01); *H04W 72/25* (2023.01)

(58) Field of Classification Search
CPC . H04W 48/10; H04W 56/0045; H04W 72/25; H04W 56/001; H04W 56/0015;
(Continued)

(56) References Cited

U.S. PATENT DOCUMENTS 12,004,098 B2 *  6/2024  Liu ................. H04W 72/23
2019/0200309 A1  6/2019  Zeng et al.
(Continued)

FOREIGN PATENT DOCUMENTS

KR   10-2018-0049030    5/2018
WO      2018-070845    4/2018
(Continued)

OTHER PUBLICATIONS

PCT International Application No. PCT/KR2021/009275, International Search Report dated Oct. 18, 2021, 4 page.

*Primary Examiner* — Kwang B Yao
*Assistant Examiner* — Syed M Bokhari
(74) *Attorney, Agent, or Firm* — LEE, HONG, DEGERMAN, KANG & WAIMEY

(57) ABSTRACT

As an example of the present disclosure, a method for operating a terminal in a wireless communication system may be disclosed. The method for operating the terminal may include: receiving, by the terminal, at least one or more synchronization signal blocks (SSBs); selecting an SSB from the at least one or more SSBs based on a priority order; and transmitting a response message including a time difference value. Herein, the time difference value may be calculated based on the selected SSB. The selected SSB may be an SSB with a high priority based on a synchronization source. Transmission timing of the response message may be determined based on the time difference value and the number of received SSBs.

16 Claims, 31 Drawing Sheets

(51) Int. Cl.
*H04W 56/00* (2009.01)
*H04W 72/25* (2023.01)

(58) Field of Classification Search
CPC ......... H04W 4/08; H04W 4/40; H04W 16/28; H04W 56/00; H04L 1/1812
USPC ........................................................ 370/328
See application file for complete search history.

(56) References Cited

U.S. PATENT DOCUMENTS

| | | | |
|---|---|---|---|
| 2020/0236718 A1* | 7/2020 | Sundararajan | G01S 13/765 |
| 2020/0245341 A1* | 7/2020 | Wu | H04W 72/02 |
| 2020/0351057 A1* | 11/2020 | Yeo | H04L 1/1854 |
| 2021/0168574 A1* | 6/2021 | Zhang | H04W 4/40 |
| 2021/0329414 A1* | 10/2021 | Yerramalli | G01S 5/02216 |
| 2021/0368460 A1* | 11/2021 | Fakoorian | H04W 8/005 |
| 2023/0171794 A1* | 6/2023 | Yoshioka | H04W 4/70 370/329 |
| 2023/0239072 A1* | 7/2023 | Xu | H04L 5/0051 370/329 |

FOREIGN PATENT DOCUMENTS

| | | |
|---|---|---|
| WO | 2019-028769 | 2/2019 |
| WO | 2019-226026 | 11/2019 |

* cited by examiner

METHOD AND APPARATUS FOR TRANSMITTING SIGNAL IN WIRELESS COMMUNICATION SYSTEM

CROSS-REFERENCE TO RELATED APPLICATION(S)

This application is the National Stage filing under 35 U.S.C. 371 of International Application No. PCT/KR2021/009275, filed on Jul. 19, 2021, which claims the benefit of earlier filing date and right of priority to Korean Application Nos. 10-2020-0089744, filed on Jul. 20, 2020, and 10-2020-0156892, filed on Nov. 20, 2020, the contents of which are all hereby incorporated by reference herein in their entireties.

BACKGROUND

Field

The present disclosure relates to a wireless communication system and, more particularly, to a synchronization procedure and resource allocation in a wireless communication system. Specifically, the present disclosure relates to a synchronization procedure and resource allocation in mmWave sidelink.

Description of the Related Art

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

The present disclosure relates to a synchronization procedure and a method for allocating a resource in a wireless communication system.

The present disclosure relates to a synchronization procedure and a method for allocating a resource in association with mmWave sidelink.

The technical objects to be achieved in the present disclosure are not limited to the above-mentioned technical objects, and other technical objects that are not mentioned may be considered by those skilled in the art through the embodiments described below.

As an example of the present disclosure, a method for operating a terminal in a wireless communication system may include: receiving, by the terminal, at least one or more synchronization signal blocks (SSB s); selecting an SSB among the at least one or more SSB s based on a priority order; and transmitting a response message including a time difference value. Herein, the time difference value may be calculated based on the selected SSB. The selected SSB may be an SSB with a high priority based on a synchronization source. Transmission timing of the response message may be determined based on the time difference value and the number of received SSBs. A resource block of the response message may be randomly determined. The time difference value may be a difference value between the selected SSB and the remaining SSB s. The response message may be a hybrid automatic repeat request (HARQ) feedback message. A slot of the response message transmission timing may be determined in advance. A physical broadcasting channel (PBCH), which is mapped to the at least one or more SSBs, may include a master information block (MIB). The MIB may include used frequency range information and response period information. The slot of the response message transmission timing may be based on the information on the response interval. The response message may include receiving timing information.

As an example of the present disclosure, a method for operating a first terminal in a wireless communication system may include: transmitting, by the first terminal, a synchronization signal block (SSB) to a second terminal; and receiving a response message including a time difference value. The response message may include a time difference value that is calculated based on the SSB. The SSB may be an SSB with a low priority based on a synchronization source. Transmission timing of the response message may be determined based on the time difference value and the number of SSBs received by the second terminal. A resource block of the response message may be randomly determined. The time difference value may be a time difference value between the SSB and another SSB received by the second terminal. The another SSB may have a higher priority than the SSB. The response message may be a hybrid automatic repeat request (HARQ) feedback message. A slot of the response message transmission timing may be determined in advance.

As an example of the present disclosure, a terminal may include a transceiver and a processor coupled with the transceiver. The processor may control the transceiver to receive at least one or more synchronization signal blocks (SSBs). The processor may control the terminal to select an SSB among the at least one or more SSBs based on a priority order. The processor may control the terminal to calculate a time difference value based on the selected SSB. The processor may control the transceiver to transmit a response message including the time difference value. The processor may control the selected SSB to be an SSB with a high priority based on a synchronization source. The processor may determine transmission timing of the response message based on the time difference value and the number of received SSBs.

As an example of the present disclosure, a first terminal may include a transceiver and a processor coupled with the transceiver. The processor may control the transceiver to transmit a synchronization signal block (SSB) to a second terminal. The processor may control the transceiver to receive a response message including a time difference value. The response message may include a time difference value that is calculated based on the SSB. The SSB may be an SSB with a low priority based on a synchronization source. Transmission timing of the response message may be determined based on the time difference value and the number of SSBs received by the second terminal.

As an example of the present disclosure, a device may include at least one memory and at least one processor functionally coupled with the at least one memory. The at least one processor may control the device to receive at least one or more synchronization signal blocks (SSBs). The at least one processor may control the device to select an SSB among the at least one or more SSBs based on a priority order. The at least one processor may control to transmit a response message including a time difference value. The time difference value may be calculated based on the selected SSB. The selected SSB may be an SSB with a high priority based on a synchronization source. Transmission timing of the response message may be determined based on the time difference value and the number of received SSBs.

As an example of the present disclosure, a non-transitory computer-readable medium may store at least one instruction. The computer-readable medium may include the at least one instruction that is executable by a processor. The at least one instruction may instruct the computer-readable medium to receive at least one or more synchronization signal blocks (SSB s). The at least one instruction may instruct the computer-readable medium to select an SSB among the at least one or more SSBs based on a priority order. The at least one instruction may control the computer-readable medium to transmit a response message including a time difference value. The time difference value may be calculated based on the selected SSB. The selected SSB may be an SSB with a high priority based on a synchronization source. Transmission timing of the response message may be determined based on the time difference value and the number of received SSBs.

The above-described aspects of the present disclosure are only a part of the preferred embodiments of the present disclosure, and various embodiments reflecting technical features of the present disclosure may be derived and understood by those skilled in the art on the basis of the detailed description of the present disclosure provided below.

The following effects may be produced by embodiments based on the present disclosure.

According to the present disclosure, a sidelink Tx terminal may efficiently receive and decode a feedback message from a sidelink Rx terminal.

According to the present disclosure, a sidelink terminal may efficiently perform initial resource allocation.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

DETAILED DESCRIPTION

Figure 1:
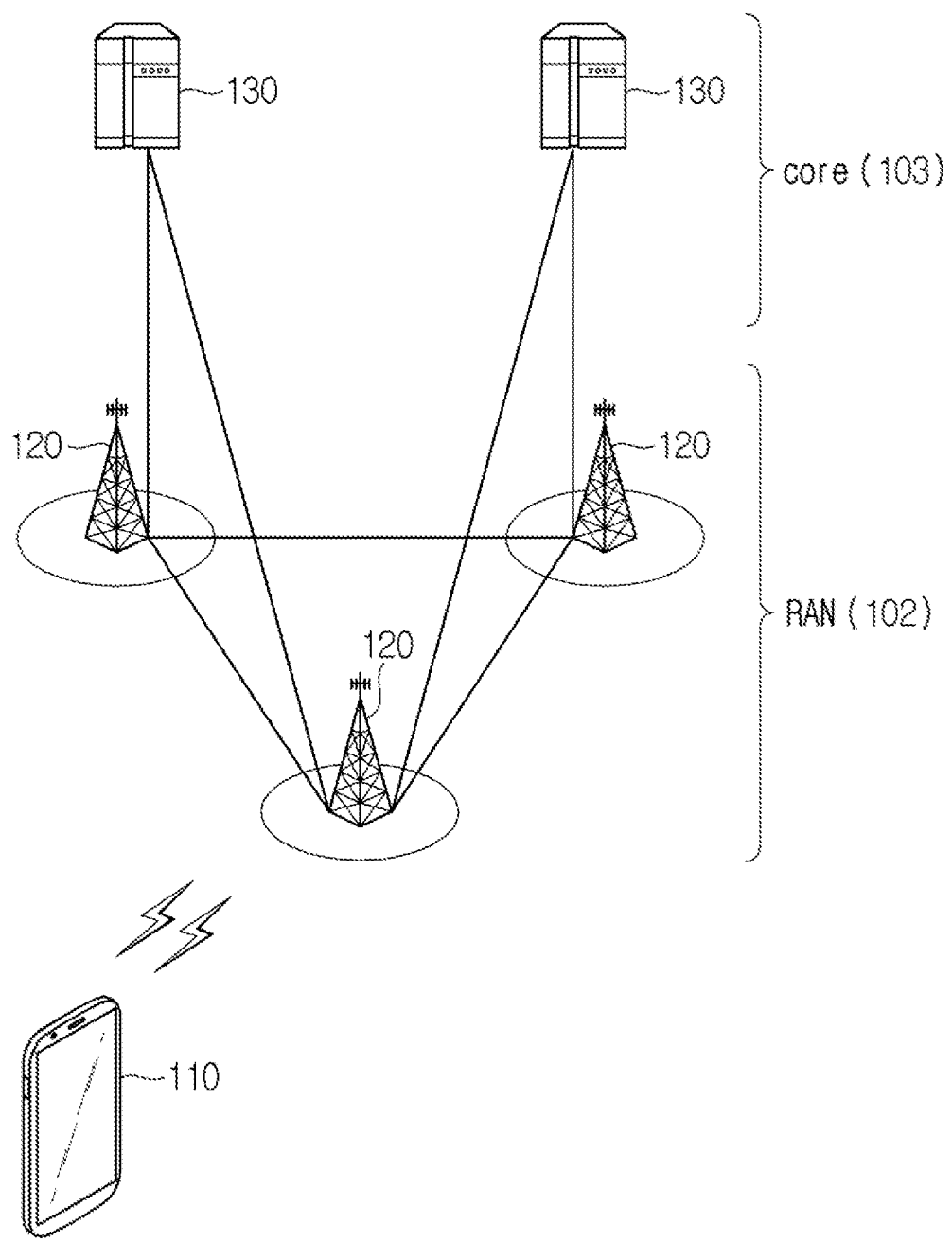
FIG. 1 illustrates a structure of a wireless communication system according to an embodiment of the present disclosure.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present specification may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in the present disclosure, reference may be made to a wireless communication standard document published before the present disclosure is filed. For example, the following document may be referred to.

Communication System Applicable to the Present Disclosure

FIG. 1 illustrates a structure of a wireless communication system according to an embodiment of the present disclosure. The embodiment of FIG. 1 may be combined with various embodiments of the present disclosure.

Referring to FIG. 1, a wireless communication system includes a radio access network (RAN) 102 and a core network 103. The radio access network 102 includes a base station 120 that provides a control plane and a user plane to a terminal 110. The terminal 110 may be fixed or mobile, and may be called other terms such as a user equipment (UE), a mobile station (MS), a subscriber station (SS), a mobile subscriber station (MSS), a mobile terminal, an advanced mobile station (AMS), or a wireless device. The base station 120 refers to a node that provides a radio access service to the terminal 110, and may be called other terms such as a fixed station, a Node B, an eNB (eNode B), a gNB (gNode B), an ng-eNB, an advanced base station (ABS), an access point, a base transceiver system (BTS), or an access point (AP). The core network 103 includes a core network entity 130. The core network entity 130 may be defined in various ways according to functions, and may be called other terms such as a core network node, a network node, or a network equipment.

Components of a system may be referred to differently according to an applied system standard. In the case of the LTE or LTE-A standard, the radio access network 102 may be referred to as an Evolved-UMTS Terrestrial Radio Access Network (E-UTRAN), and the core network 103 may be referred to as an evolved packet core (EPC). In this case, the core network 103 includes a Mobility Management Entity (MME), a Serving Gateway (S-GW), and a packet data network-gateway (P-GW). The MME has access information of the terminal or information on the capability of the terminal, and this information is mainly used for mobility management of the terminal. The S-GW is a gateway having an E-UTRAN as an endpoint, and the P-GW is a gateway having a packet data network (PDN) as an endpoint.

In the case of the 5G NR standard, the radio access network 102 may be referred to as an NG-RAN, and the core network 103 may be referred to as a 5GC (5G core). In this case, the core network 103 includes an access and mobility management function (AMF), a user plane function (UPF), and a session management function (SMF). The AMF provides a function for access and mobility management in units of terminals, the UPF performs a function of mutually transmitting data units between an upper data network and the radio access network 102, and the SMF provides a session management function.

The BSs 120 may be connected to one another via Xn interface. The BS 120 may be connected to one another via core network 103 and NG interface. More specifically, the BSs 130 may be connected to an access and mobility management function (AMF) via NG-C interface, and may be connected to a user plane function (UPF) via NG-U interface.

V2X or Sidelink Communication

Figure 2A:
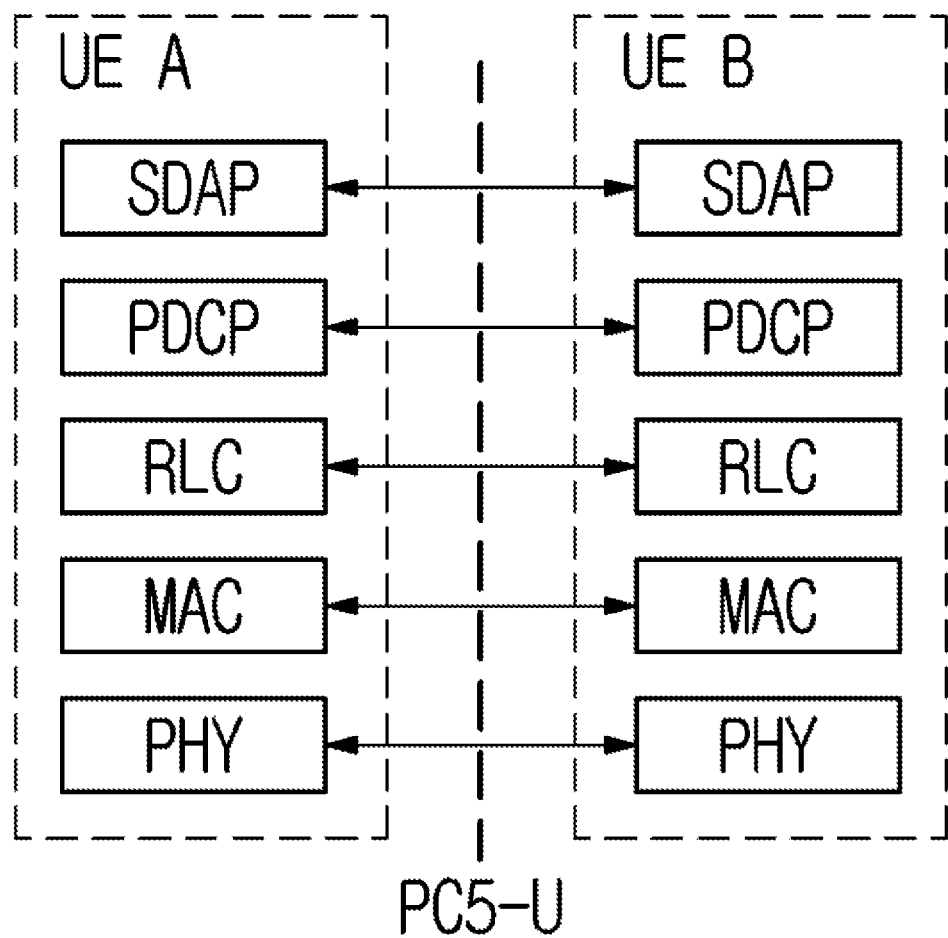
FIG. 2A and FIG. 2B illustrate a radio protocol architecture for SL communication according to an embodiment of the present disclosure.
Figure 2B:
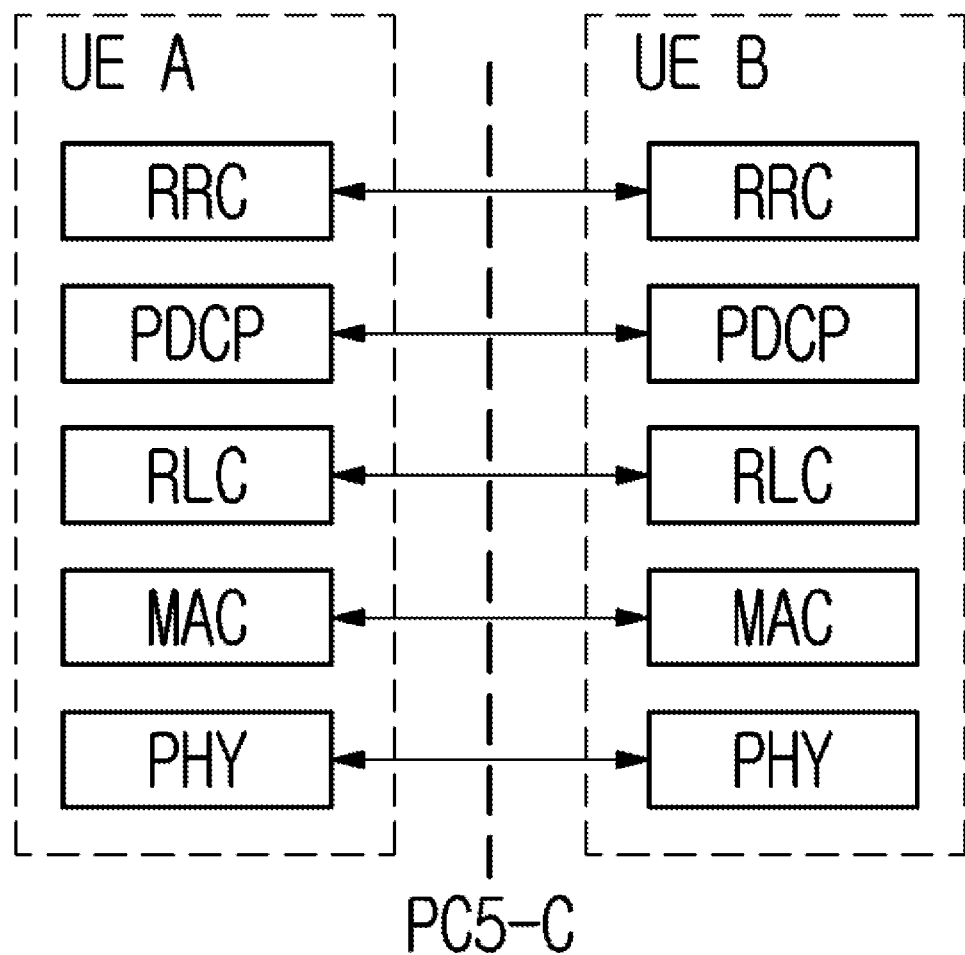

FIGS. 2A and 2B illustrate a radio protocol architecture for a SL communication applicable to the present disclosure. The embodiment of FIGS. 2A and 2B may be combined with various embodiments of the present disclosure. More specifically, FIG. 2A exemplifies a user plane protocol stack, and FIG. 2B exemplifies a control plane protocol stack.

Sidelink Synchronization Signal (SLSS) and Synchronization Information

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Synchronization Acquisition of SL Terminal

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 3:
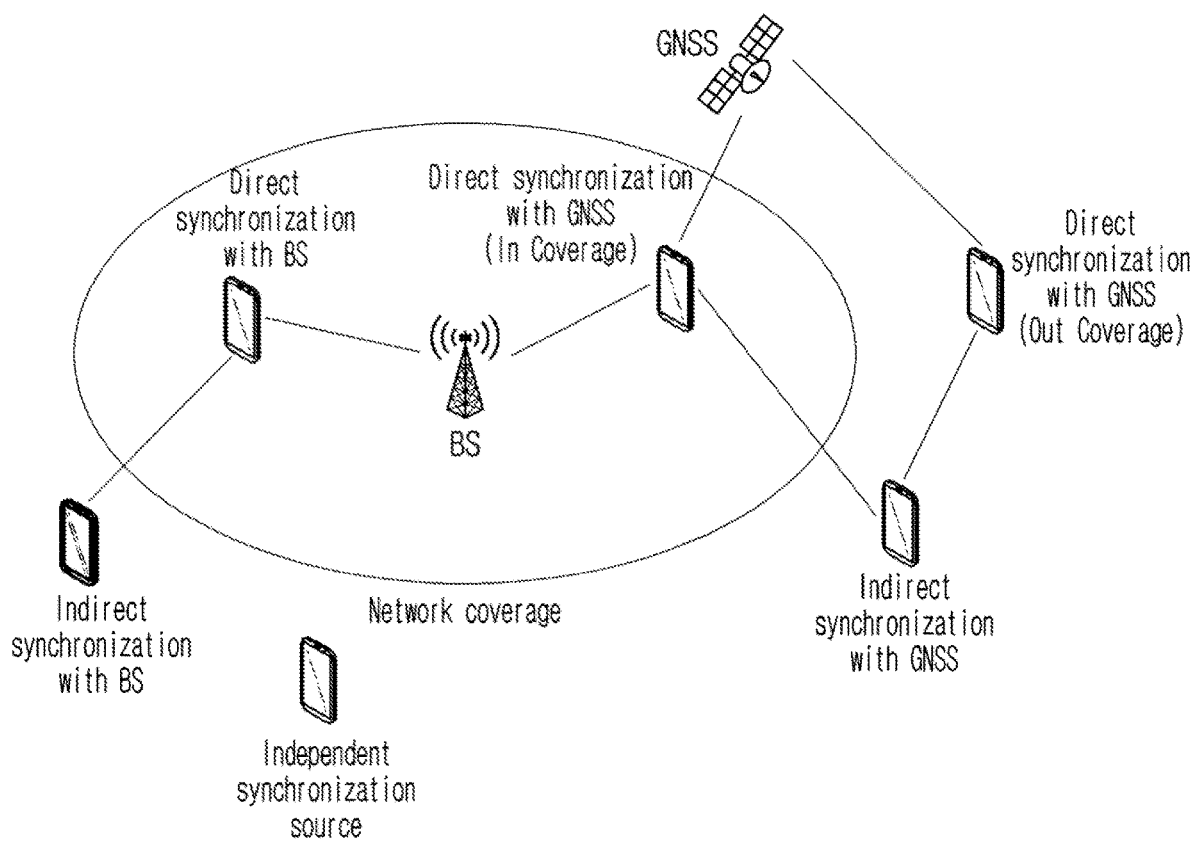
FIG. 3 illustrates a synchronization source or a synchronization reference of V2X according to an embodiment of the present disclosure.

FIG. 3 illustrates a synchronization source or synchronization reference of V2X applicable to the present disclosure. The embodiment of FIG. 8 may be combined with various embodiments of the present disclosure.

Referring to FIG. 3, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or SL communication. In this case, the UE may follow the synchronization configuration received from the BS. When the UE fails in detecting any cell in the carrier used for the V2X or SL communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE. Alternatively, the synchronization source and the preference may be configured for the UE by a control message provided by the BS.

An SL synchronization source may be related to a synchronization priority. For example, the relationship between synchronization sources and synchronization priorities may be defined as shown in [Table 2] or [Table 3]. [Table 2] or [Table 3] is merely an example, and the relationship between synchronization sources and synchronization priorities may be defined in various manners.

TABLE 1

| Priority Level | GNSS-based synchronization | eNB/gNB-based synchronization |
| --- | --- | --- |
| P0 | GNSS | eNB/gNB |
| P1 | All UEs synchronized directly with GNSS | All UEs synchronized directly with NB/gNB |
| P2 | All UEs synchronized indirectly with GNSS | All UEs synchronized indirectly with eNB/gNB |
| P3 | All other UEs | GNSS |
| P4 | N/A | All UEs synchronized directly |

TABLE 1-continued

| Priority Level | GNSS-based synchronization | eNB/gNB-based synchronization |
| --- | --- | --- |
| P5 | N/A | with GNSS All UEs synchronized indirectly with GNSS |
| P6 | N/A | All other UEs |

TABLE 2

| Priority Level | GNSS-based synchronization | eNB/gNB-based synchronization |
| --- | --- | --- |
| P0 | GNSS | eNB/gNB |
| P1 | All UEs synchronized directly with GNSS | All UEs synchronized directly with eNB/gNB |
| P2 | All UEs synchronized indirectly with GNSS | All UEs synchronized indirectly with eNB/gNB |
| P3 | eNB/gNB | GNSS |
| P4 | All UEs synchronized directly with eNB/gNB | All UEs synchronized directly with GNSS |
| P5 | All UEs synchronized indirectly with eNB/gNB | All UEs synchronized indirectly with GNSS |
| P6 | Remaining UE(s) with lower priority | Remaining UE(s) with lower priority |

In [Table 1] or [Table 2], P0 may represent a highest priority, and P6 may represent a lowest priority. In [Table 1] or [Table 2], the BS may include at least one of a gNB or an eNB.

Whether to use GNSS-based synchronization or eNB/gNB-based synchronization may be (pre)determined. In a single-carrier operation, the UE may derive its transmission timing from an available synchronization reference with the highest priority.

For example, the UE may (re)select a synchronization reference, and the UE may obtain synchronization from the synchronization reference. In addition, the UE may perform SL communication (e.g., PSCCH/PSSCH transmission/reception, physical sidelink feedback channel (PSFCH) transmission/reception, S-SSB transmission/reception, reference signal transmission/reception, etc.) based on the obtained synchronization.

Figure 4A:
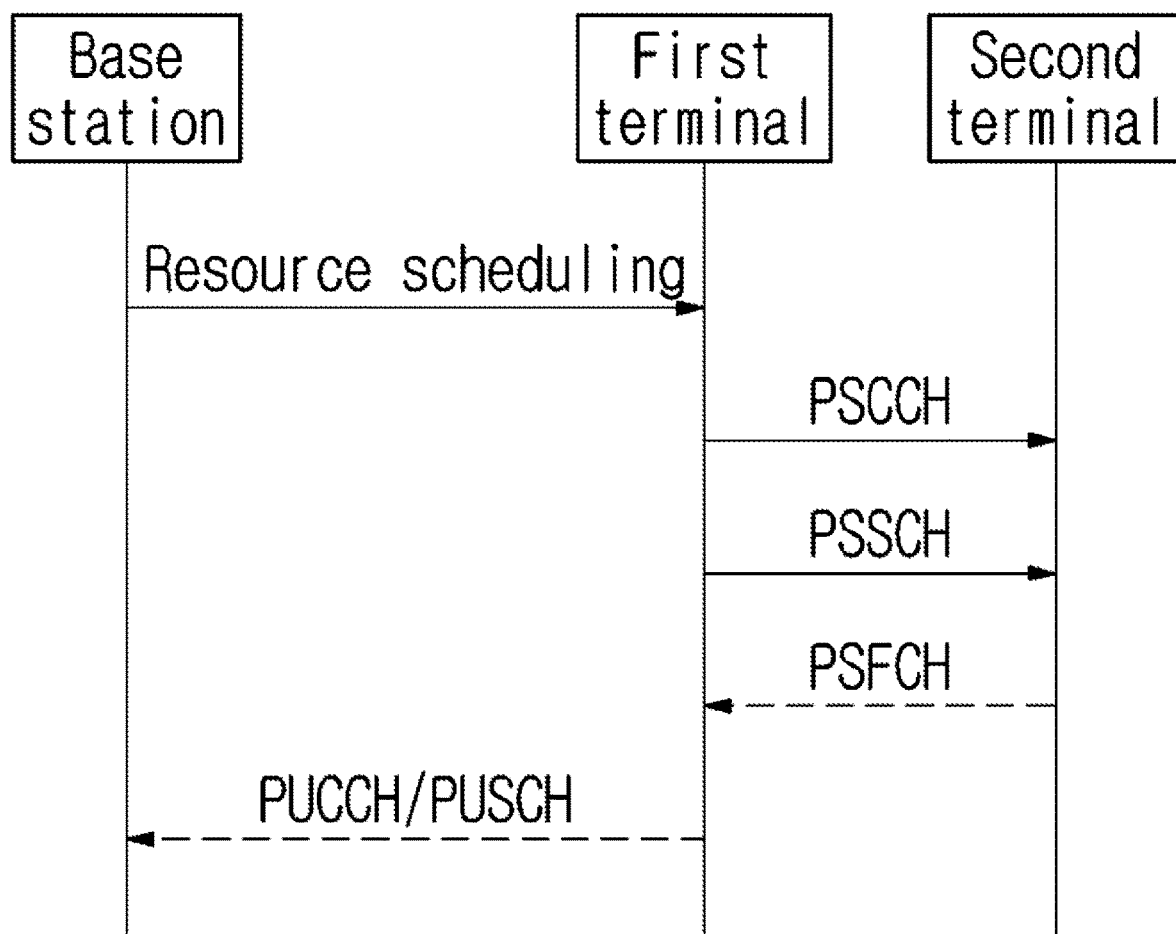
FIG. 4A and FIG. 4B illustrate a procedure in which a terminal performs V2X or SL communication according to a transmission mode, in accordance with an embodiment of the present disclosure.
Figure 4B:
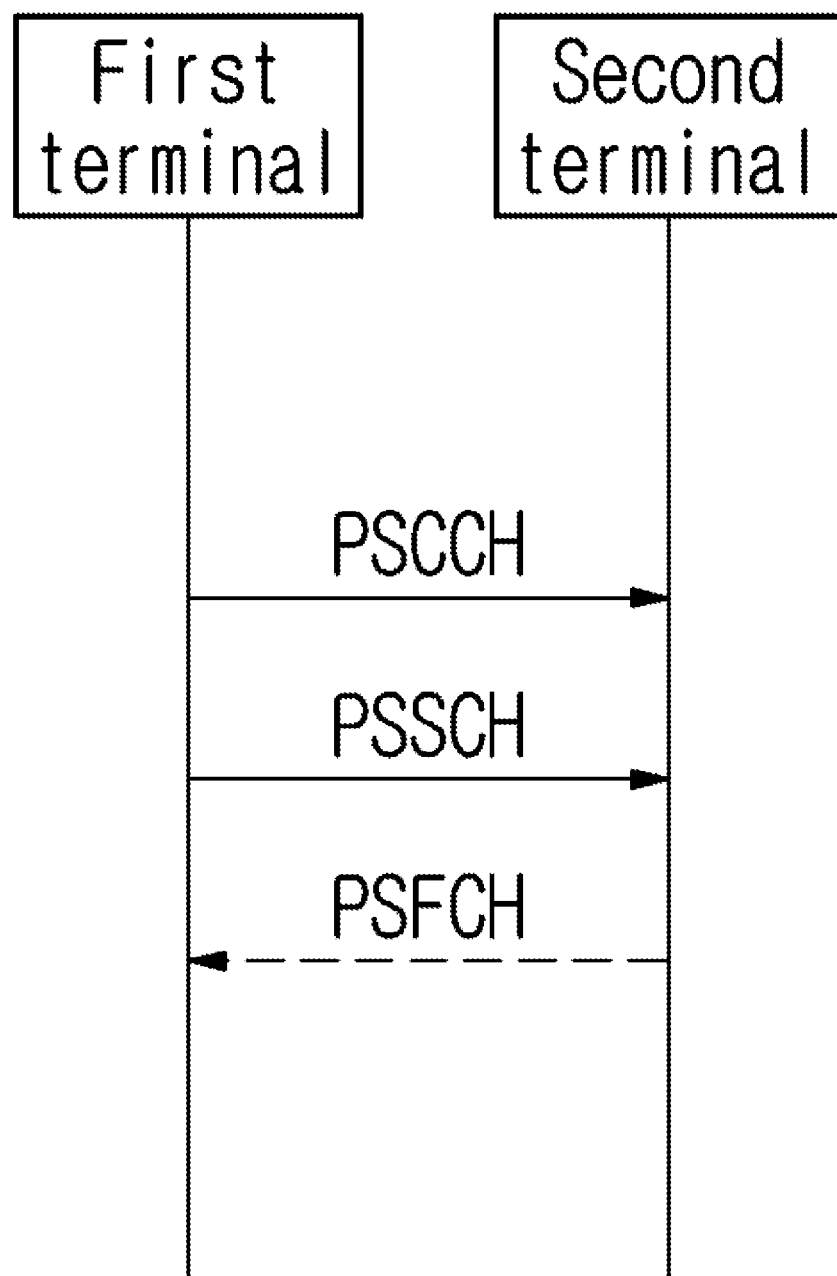

FIGS. 4A and 4B illustrate a procedure of performing V2X or SL communication by a terminal based on a transmission mode applicable to the present disclosure. The embodiment of FIGS. 4A and 4B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 4A exemplifies a UE operation related to an LTE transmission mode 1 or an LTE transmission mode 3. Alternatively, for example, FIG. 9B exemplifies a UE operation related to an NR resource allocation mode 1. For example, the LTE transmission mode 1 may be applied to general SL communication, and the LTE transmission mode 3 may be applied to V2X communication.

For example, FIG. 4B exemplifies a UE operation related to an LTE transmission mode 2 or an LTE transmission mode 4. Alternatively, for example, FIG. 4A exemplifies a UE operation related to an NR resource allocation mode 2.

Referring to FIG. 4A, in the LTE transmission mode 1, LTE transmission mode 3, or the NR resource allocation mode 1, a BS may schedule an SL resource to be used by the UE for SL transmission. For example, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource (s) to the first UE, and the base station may transmit a DCI related to activation or release of the CG resource(s) to the first UE.

Subsequently, the first UE may transmit a PSCCH (e.g., sidelink control information (SCI) or 1st-stage SCI) to a second UE based on the resource scheduling. After then, the first UE may transmit a PSSCH (e.g., 2nd-stage SCI, MAC PDU, data, etc.) related to the PSCCH to the second UE. After then, the first UE may receive a PSFCH related to the PSCCH/PSSCH from the second UE. For example, HARQ feedback information (e.g., NACK information or ACK information) may be received from the second UE through the PSFCH. After then, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1. Table 4 shows an example of a DCI for SL scheduling. Referring to FIG. 4B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannel(s). For example, subsequently, a first UE which has selected resource(s) from a resource pool by itself may transmit a PSCCH (e.g., sidelink control information (SCI) or 1st-stage SCI) to a second UE by using the resource(s). After then, the first UE may transmit a PSSCH (e.g., 2nd-stage SCI, MAC PDU, data, etc.) related to the PSCCH to the second UE. In step S8030, the first UE may receive a PSFCH related to the PSCCH/PSSCH from the second UE.

Referring to FIGS. 4A and 4B, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1st SCI, a first SCI, a 1st-stage SCI or a 1st-stage SCI format, and a SCI transmitted through a PSSCH may be referred to as a 2nd SCI, a second SCI, a 2nd-stage SCI or a 2nd-stage SCI format. For example, the 1st-stage SCI format may include a SCI format 1-A, and the 2nd-stage SCI format may include a SCI format 2-A and/or a SCI format 2-B. Table 5 shows an example of a 1st-stage SCI format.

Referring to FIG. 4A or 4B, the first UE may receive the PSFCH. For example, the first UE and the second UE may determine a PSFCH resource based on Table 7, and the second UE may transmit HARQ feedback to the first UE using the PSFCH resource.

Referring to FIG. 4A, the first UE may transmit SL HARQ feedback to the base station through the PUCCH and/or the PUSCH.

Figure 5A:
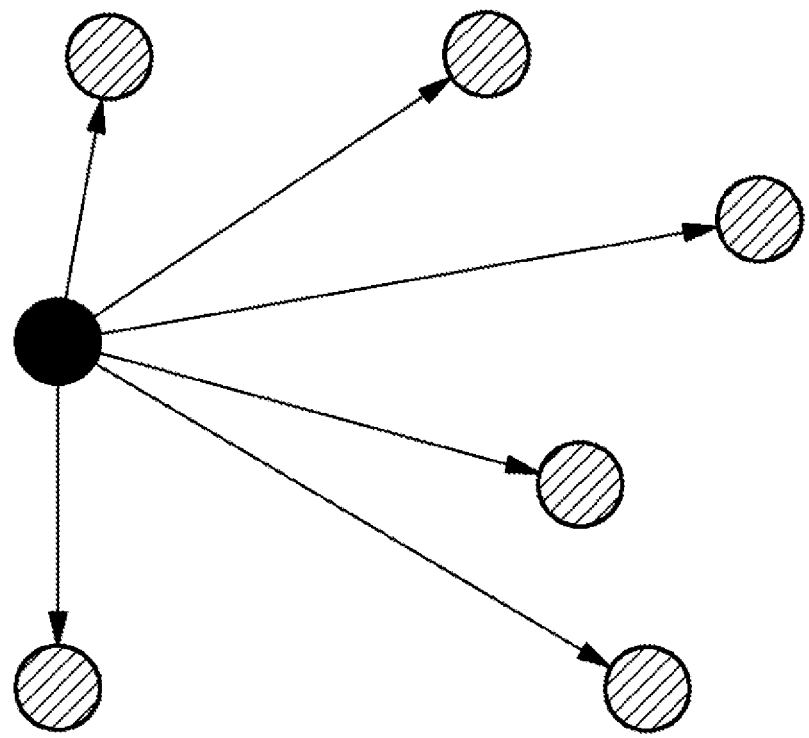
FIG. 5A to FIG. 5C illustrate 3 cast types according to an embodiment of the present disclosure.
Figure 5B:
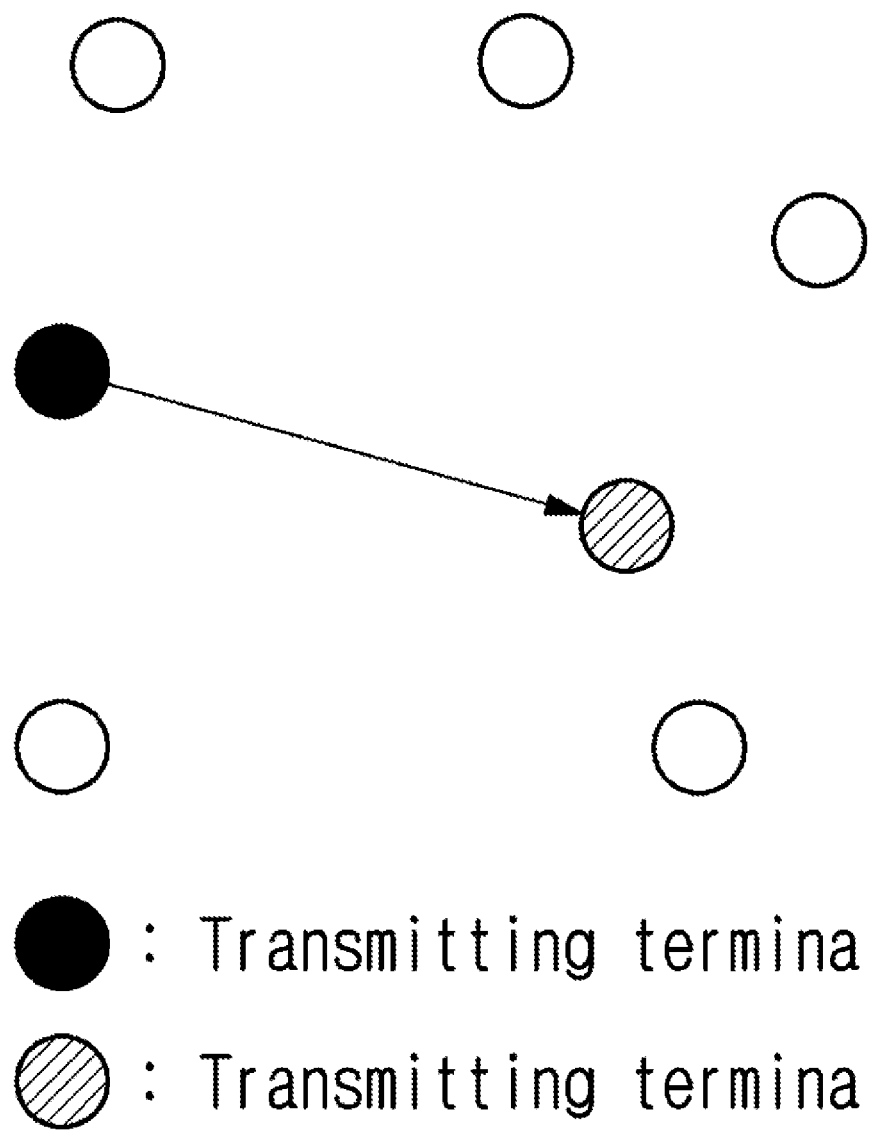
Figure 5C:
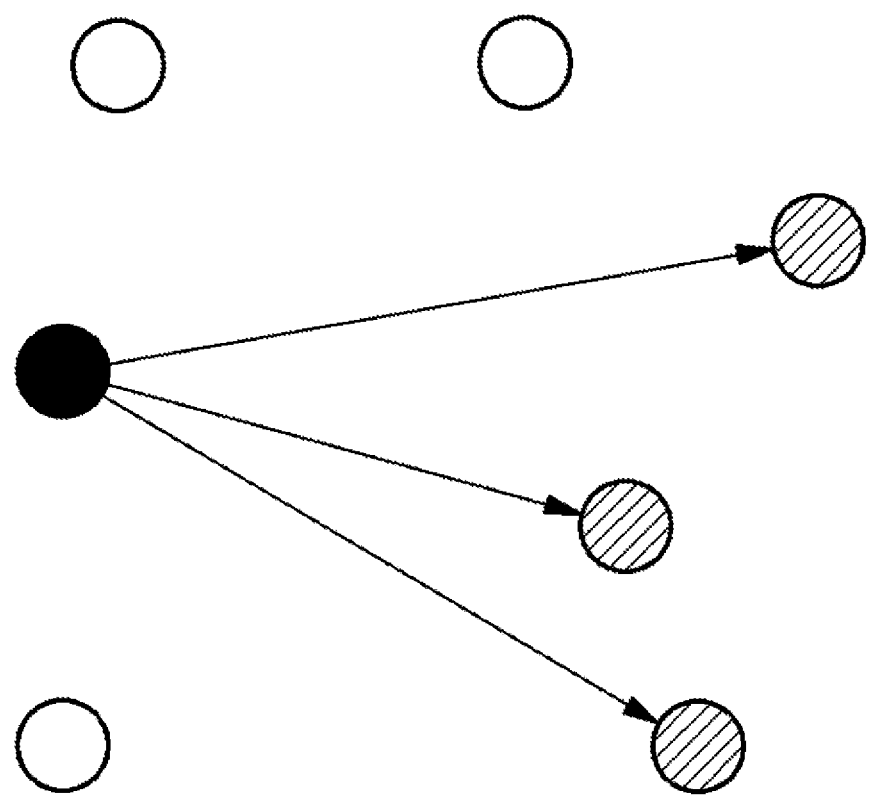

FIGS. 5A to 5C illustrate three cast types applicable to the present disclosure. The embodiment of FIGS. 5A to 5C may be combined with various embodiments of the present disclosure.

Specifically, FIG. 5A exemplifies broadcast-type SL communication, FIG. 5B exemplifies unicast type-SL communication, and FIG. 5C exemplifies groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hybrid Automatic Request (HARQ) Procedure

SL HARQ feedback may be enabled for unicast. In this case, in a non-code block group (non-CBG) operation, when the receiving UE decodes a PSCCH directed to it and succeeds in decoding an RB related to the PSCCH, the receiving UE may generate an HARQ-ACK and transmit the HARQ-ACK to the transmitting UE. On the other hand, after the receiving UE decodes the PSCCH directed to it and fails in decoding the TB related to the PSCCH, the receiving UE may generate an HARQ-NACK and transmit the HARQ-NACK to the transmitting UE.

For example, SL HARQ feedback may be enabled for groupcast. For example, in a non-CBG operation, two HARQ feedback options may be supported for groupcast.

(1) Groupcast option 1: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may not transmit an HARQ-ACK to the transmitting UE.

(2) Groupcast option 2: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may transmit an HARQ-ACK to the transmitting UE on the PSFCH.

For example, when groupcast option 1 is used for SL HARQ feedback, all UEs performing groupcast communication may share PSFCH resources. For example, UEs belonging to the same group may transmit HARQ feedbacks in the same PSFCH resources.

For example, when groupcast option 2 is used for SL HARQ feedback, each UE performing groupcast communication may use different PSFCH resources for HARQ feedback transmission. For example, UEs belonging to the same group may transmit HARQ feedbacks in different PSFCH resources.

In the present disclosure, HARQ-ACK may be referred to as ACK, ACK information, or positive-ACK information, and HARQ-NACK may be referred to as NACK, NACK information, or negative-ACK information.

SL Measurement and Reporting

For the purpose of QoS prediction, initial transmission parameter setting, link adaptation, link management, admission control, and so on, SL measurement and reporting (e.g., an RSRP or an RSRQ) between UEs may be considered in SL. For example, the receiving UE may receive an RS from the transmitting UE and measure the channel state of the transmitting UE based on the RS. Further, the receiving UE may report CSI to the transmitting UE. SL-related measurement and reporting may include measurement and reporting of a CBR and reporting of location information. Examples of CSI for V2X include a channel quality indicator (CQI), a precoding matrix index (PMI), a rank indicator (RI), an RSRP, an RSRQ, a path gain/pathloss, an SRS resource indicator (SRI), a CSI-RS resource indicator (CRI), an interference condition, a vehicle motion, and the like. CSI reporting may be activated and deactivated depending on a configuration.

For example, the transmitting UE may transmit a channel state information-reference signal (CSI-RS) to the receiving UE, and the receiving UE may measure a CQI or RI using the CSI-RS. For example, the CSI-RS may be referred to as an SL CSI-RS. For example, the CSI-RS may be confined to PSSCH transmission. For example, the transmitting UE may transmit the CSI-RS in PSSCH resources to the receiving UE.

Specific Embodiments of the Present Disclosure

A terminal may receive a plurality of synchronization signal blocks (SSBs) in a mmWave beam environment. For example, a terminal may receive a plurality of SSBs during an initial access or in a tracking period. In addition, a terminal may receive data from a plurality of other terminals. A terminal may set time synchronization (time sync) by selecting one SSB and receive data. However, when a Rx terminal receives data from terminals with different references, the Rx terminal may fail in decoding. In addition, a Rx terminal may not consider timing advance due to a vehicle-to-everything (V2X) feature. Accordingly, when a Rx terminal transmits a feedback message, there may be a time misalignment (time misalign).

In a wireless communication system, an anchor node may adjust transmission timing. Specifically, a second anchor node may receive a first signal from a first anchor node. The second anchor node may transmit a second signal to the first anchor node as a response to the first signal. The second anchor node may receive a propagation delay value based on the second signal from the first anchor node. The second anchor node may determine a transmission time of the first signal by the first anchor node based on a time of receiving the first signal and the propagation delay value. Based on the transmission time of the first signal, the second anchor node may adjust transmission timing.

That is, in a wireless communication system, an anchor node may transmit a first message and transmit ACK or NACK accordingly. The anchor node may calculate a round trip delay between the first message and ACK or NACK. The anchor node may transmit data based on a round trip delay value. When such a transmission scheme is applied to V2X, other terminals connected within 1 hop, apart from Tx and Rx terminals, may be affected. A terminal may transmit data and receive a corresponding response and then deliver a timing advance value to a Rx terminal. That is, a terminal may deliver a timing advance value to a Rx terminal through 3 steps. The present disclosure proposes a 2-step scheme in which a terminal receiving an SSB delivers the SSB to a terminal transmitting an SSB for transmission timing. In addition, the present disclosure proposes a method of efficiently matching time synchronization.

Meanwhile, a terminal may be in sync with a Rx terminal by transmitting a sidelink synchronization signal (SLSS) and a physical broadcast channel (PBCH) for V2X data transmission. Then, the terminal may perform sensing for resource allocation. The terminal may find an empty resource through sensing. A terminal, which performs beam-based communication, may perform beam alignment by transmitting an SLSS and a PBCH omnidirectionally. Due to mmWave features, a terminal may not measure a surrounding channel environment after beam alignment, which is problematic. Accordingly, a terminal may allocate a resource in an additional appointed period through resource transmission and a feedback receiving operation, and a delay may occur. The present disclosure proposes a method of reducing such a delay.

In a V2X environment, a Tx terminal and a Rx terminal may form a beam. A Tx terminal may select a resource to transmit data to a Rx terminal with a beam being formed. The Tx terminal may inform the Rx terminal of an empty resource period as a candidate for transmitting data. The Rx terminal may check whether or not the resource period is available for receiving. When the resource period is not available for receiving, the Rx terminal may perform negotiation for another period and deliver it to the Tx terminal. When the Tx terminal can transmit data in the period negotiated by the Rx terminal, the Tx terminal may transmit a confirm message and transmit data using the period. In this case, a terminal has a burden of resource negotiation with another terminal. The present disclosure proposes an operation for a terminal to perform initial transmission in an SLSS/PBCH period without allocating an additional resource for negotiation.

A terminal may allocate a resource when a handover occurs. However, the present disclosure proposes a method for a terminal to quickly perform initial resource allocation.

Figure 6:
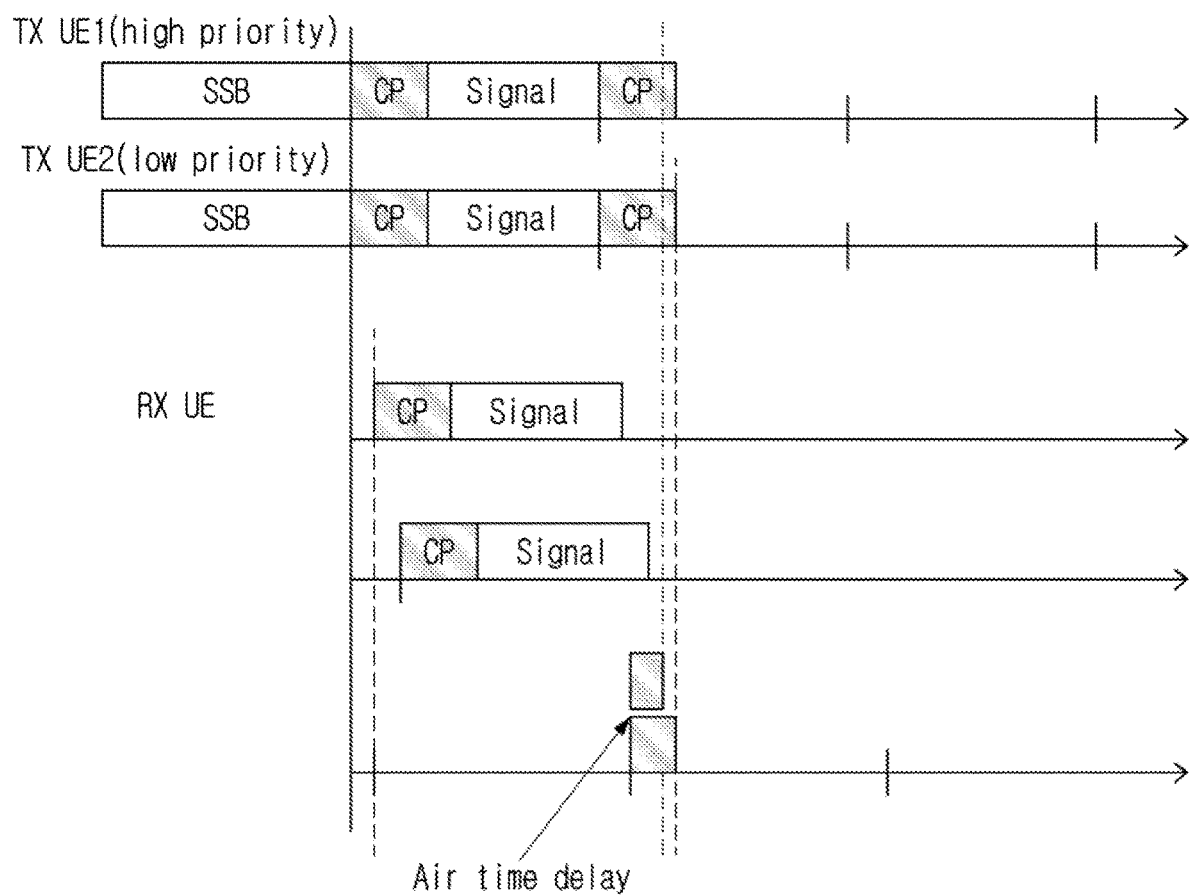
FIG. 6 is a view illustrating an example of an operation of a terminal that is applicable to the present disclosure.

FIG. 6 is a view illustrating an example of an operation of a terminal that is applicable to the present disclosure. Referring to FIG. 6, a transmission (Tx) terminal (user equipment UE) 1 and a Tx terminal (UE) 2 may transmit an SSB to a reception (Rx) terminal (user equipment UE). In an mmWave beam-based V2X environment, the Tx terminal 1 and the Tx terminal 2 may transmit an SSB to the Rx terminal. The Rx terminal receives a plurality of SSBs.

The Rx terminal selects an SSB based on a sync source priority. As an example, the Rx terminal may select a highest SSB based on a sync source priority. Based on this selection, the Rx terminal may decode a physical broadcasting channel (PBCH) in a next cycle and configure timing. Referring to FIG. 6, the Tx terminal 1 has a high priority, and the Tx terminal 2 has a low priority. The Rx terminal may select an SSB of the Tx terminal 1 based on a sync source priority. The Rx terminal may decode a PBCH and configure timing based on the SSB of the Tx terminal 1. Based on one sync source, the Rx terminal may receive data from a terminal that does not have the sync source. However, when the Rx terminal transmits a feedback message, the Rx terminal may transmit the feedback message based on a sync source. Accordingly, a terminal without that sync source may not receive the feedback message. Referring to FIG. 6, the Rx terminal may receive data from the Tx terminal 2. In addition, the Rx terminal may transmit a feedback message to the Tx terminal 2 based on the sync source of the Tx terminal 1. However, the Tx terminal 2 may not receive the feedback message. The present disclosure proposes a method for a terminal to receive an SSB and to deliver Rx time sync of a Tx terminal (UE) before receiving data.

Figure 7A:
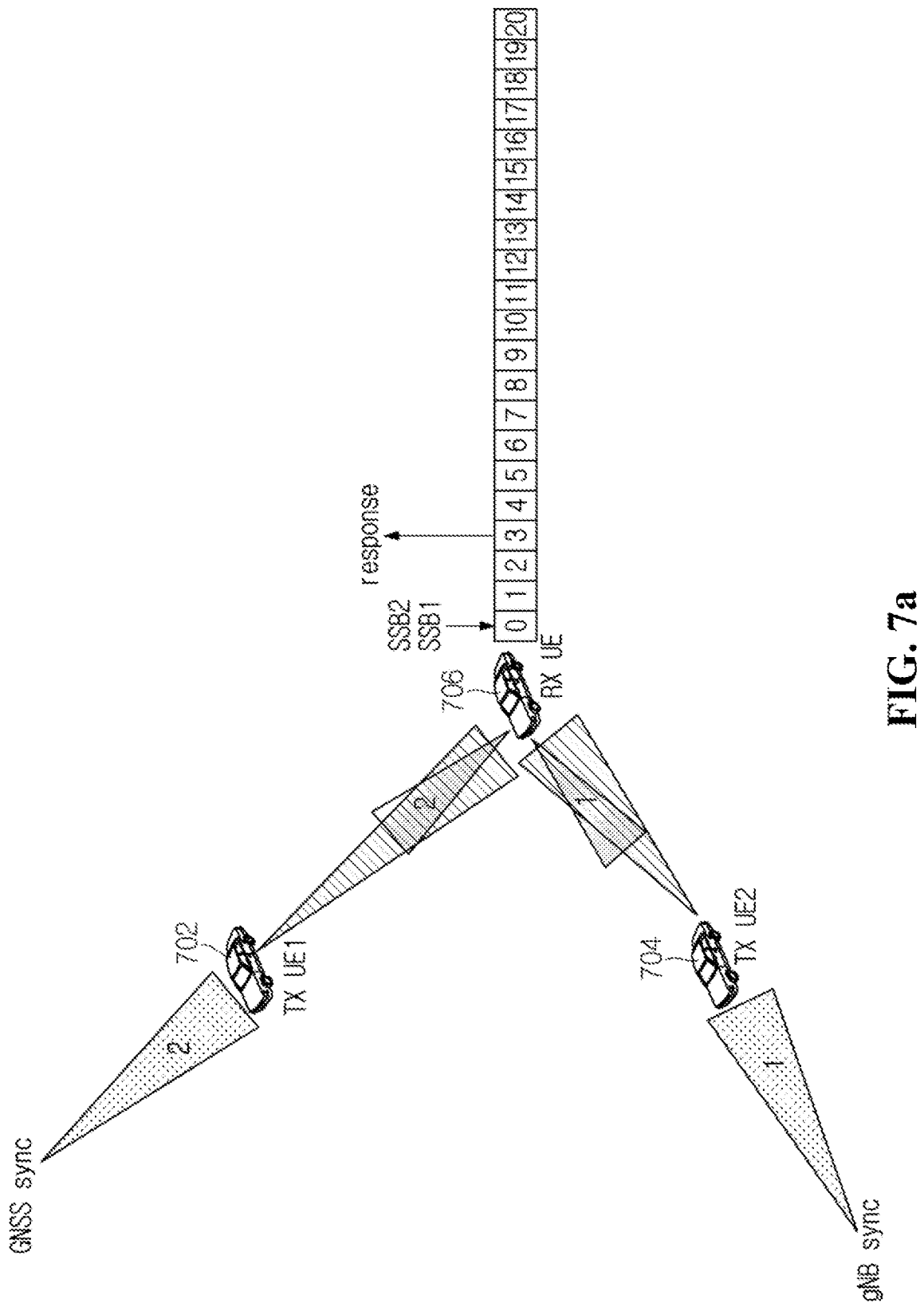
FIG. 7A and FIG. 7B illustrate an operation of a terminal that is applicable to the present disclosure.
Figure 7B:
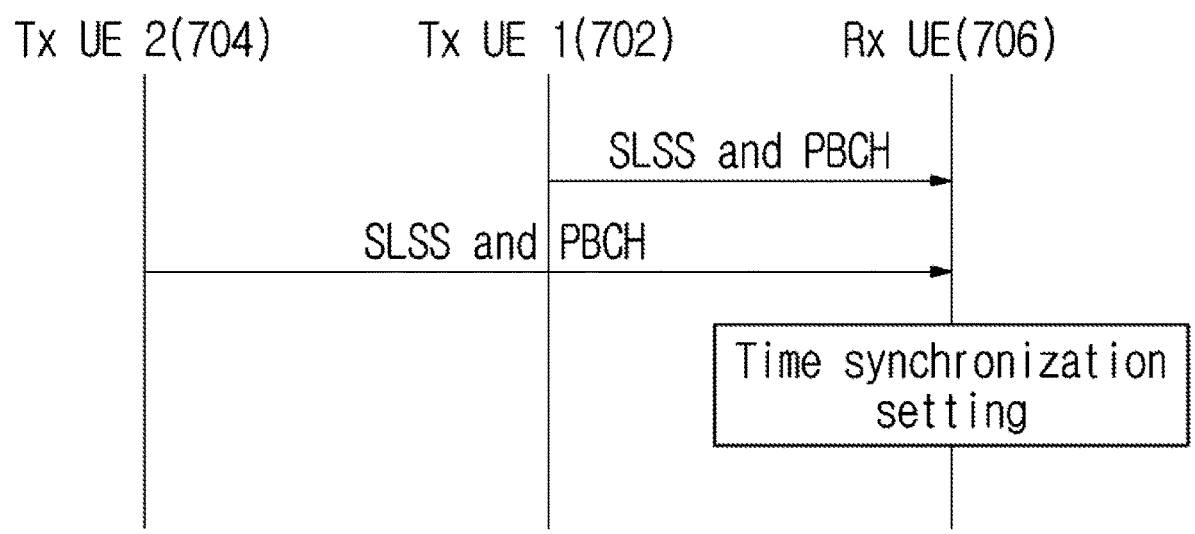

FIG. 7A and FIG. 7B illustrate an operation of a terminal that is applicable to the present disclosure. Referring to FIG. 7A, a Tx terminal (UE) 1 and a Tx terminal (UE) 2 may have different reference sources. Alternatively, the Tx terminal 1 and the Tx terminal 2 may have different priority values. Tx terminals may transmit an SSB, and a Rx terminal may receive the SSB.

The Tx terminal 1 702 may be synchronized with global navigation satellite systems (GNSS). For example, the Tx terminal 1 702 may be synchronized directly with GNSS or be synchronized indirectly with GNSS through a terminal (inside network coverage or outside network coverage), which is directly synchronized with GNSS. A Tx terminal 2 704 may be synchronized with a base station. For example, the Tx terminal 2 may be synchronized directly with a base station or be synchronized with another terminal that is time/frequency-synchronized with the base station. The base station may be eNB or gNB. For example, when a terminal is within network coverage, the terminal may receive synchronization information provided by a base station and be synchronized directly with the base station. Then, the terminal may provide synchronization information to another terminal that is adjacent to it.

A Rx terminal 706 may receive SSB2 from the Tx terminal 1 702. The Rx terminal 706 may receive SSB1 from the Tx terminal 2 704. SSB1 and SSB2 may be different from each other. For example, SSB1 may be 200 samples. SSB2 may be 310 samples. Referring to FIG. 7B, the Rx terminal may receive an SLSS and a PBCH from the Tx terminal 1. In addition, the Rx terminal may receive an SLSS and a PBCH from the Tx terminal 2. SLSS/PBCH transmitted by the Tx terminal 1 and SLSS/PBCH transmitted by the Tx terminal 2 may be different from each other. The Rx terminal may receive an SLSS and a PBCH and set time sync.

Figure 8:
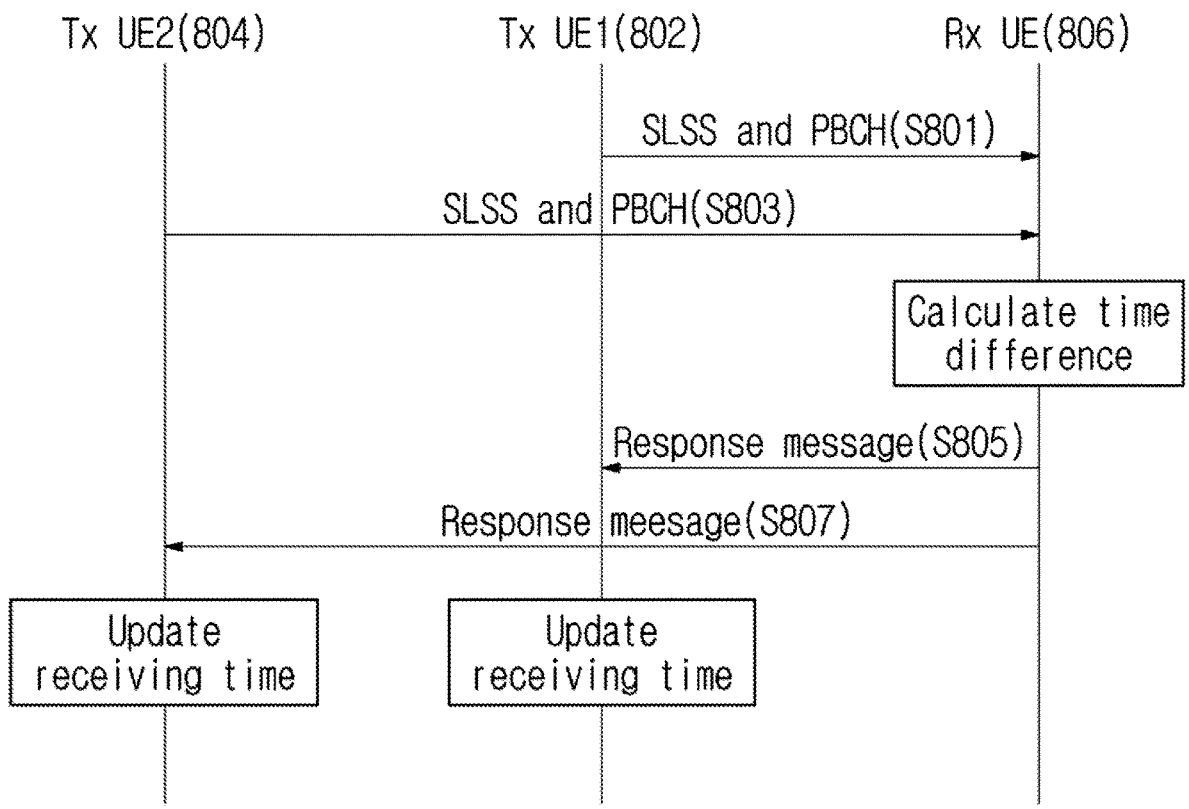
FIG. 8 and FIG. 9 are views illustrating a terminal operation procedure that is applicable to the present disclosure.
Figure 9:
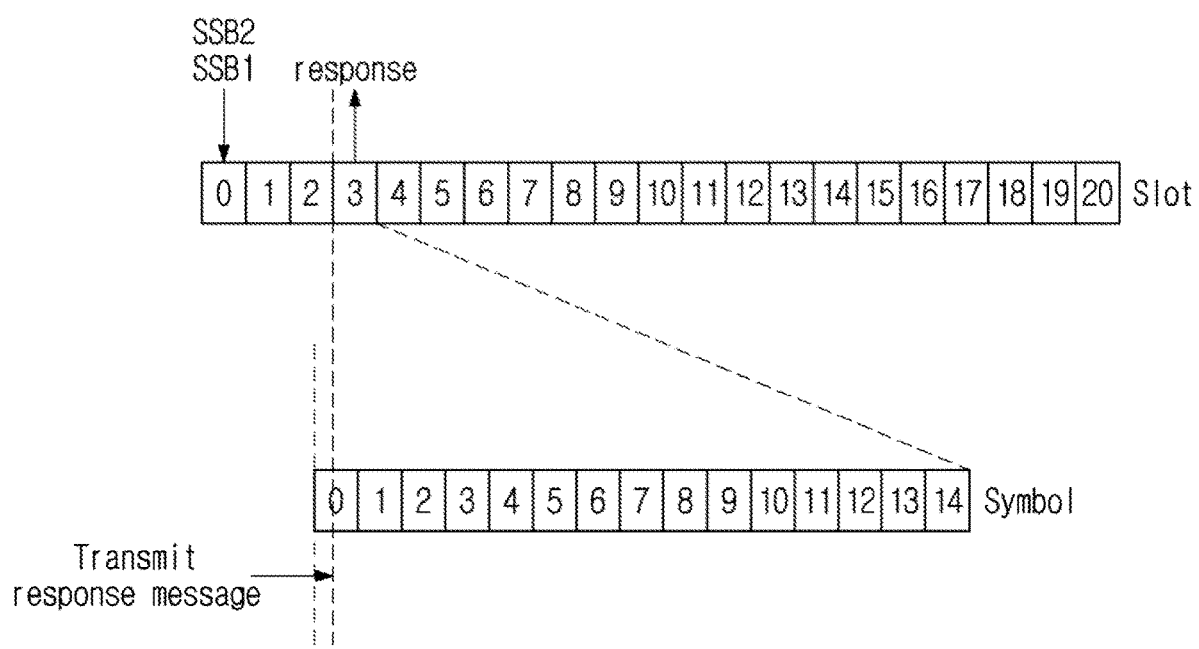

FIG. 8 and FIG. 9 are views illustrating a terminal operation procedure that is applicable to the present disclosure. Referring to FIG. 8, at step S801, a Tx terminal 1 802 may transmit an SLSS and a PBCH to a Rx terminal 806. That is, the Tx terminal 1 may transmit an SSB to the Rx terminal. At step S803, a Tx terminal 2 may transmit an SLSS and a PBCH to the Rx terminal. That is, the Tx terminal 2 may transmit an SSB to the Rx terminal. The Rx terminal may receive an SSB from a plurality of terminals and select an SSB with a high priority. Accordingly, the Rx terminal 806 may select an SSB with a higher priority between the SSB of the Tx terminal 1 and the SSB of the Tx terminal 2. The Rx terminal may derive a sync time value of the selected SSB. The sync time value may be determined in millisecond units. The Rx terminal may receive an SSB at 160 msec intervals. In addition, the Rx terminal may receive an SSB within 5 msec at 160 msec intervals. Accordingly, a terminal may determine up to 5 msec as a sync time value.

A Rx terminal may exclude an SSB on a boundary after a sync time of a selected SSB. For example, when a Rx terminal selects SSB=1 msec and SSB=2 msec has a next priority, the Rx terminal may exclude the SSB with the next priority. Even when the Rx terminal excludes the SSB with next priority, if decoding is successful, there may be no problem with sending feedback.

Based on a selected SSB, the Rx terminal may calculate a time difference value from another SSB. For example, when a terminal receives 3 SSBs, the terminal may calculate time difference values among a best SSB, a second SSB, and a third SSB. The Rx terminal may transmit time difference values to terminals that transmit SSBs. At step S805, the Rx terminal may transmit a response message to the Tx terminal 1. At step S807, the Rx terminal may transmit a response message to the Tx terminal 2. A response message transmitted by the Rx terminal may include a time difference value. The Rx terminal may transmit a response message through a physical sidelink control channel (PSCCH) or a physical sidelink shared channel (PSSCH). Timing for the Rx terminal to transmit a response message may be calculated by (high priority SSB sync time–low priority SSB sync time)/(total SSB number).

Referring to FIG. 9, a Rx terminal may calculate timing of transmitting a response message by (time difference between second SSB and best SSB+time difference between third SSB and best SSB)/2. That is, the Rx terminal may transmit a response message by pulling or pushing as much as an average reception difference value. A message format may include every time difference value. The Rx terminal may transmit a response message by using appointed timing as slot-unit transmission timing. Referring to FIG. 9, the Rx terminal may receive SSB 1 and SSB2 and then transmit a response message after 2 slots. A Tx terminal may receive the response message by randomly determining a resource block area.

Meanwhile, a terminal, which transmits an SSB, may need a unique ID to know a time difference value or differential value of the SSB transmitted by it. A time difference value or differential sync may be an SSB ID. In addition, a time difference value or differential sync may be an identifier of a specific terminal. That is, a time difference value or differential sync may be a UE ID. SSB ID may be expressed by SSB #.

As an example, a Tx terminal with an ID of SSB3 may receive a response message. After receiving the response message, the Tx terminal may confirm that there is a 1 ms difference from downlink sync or sidelink sync of a terminal receiving SSB. Next, the Tx terminal may perform a configuration operation so that it can transmit data and after 1 ms receive a corresponding feedback message.

The Tx terminal 1 802 and the Tx terminal 2 804, which receive a response message, may update Rx time respectively.

Figure 10:
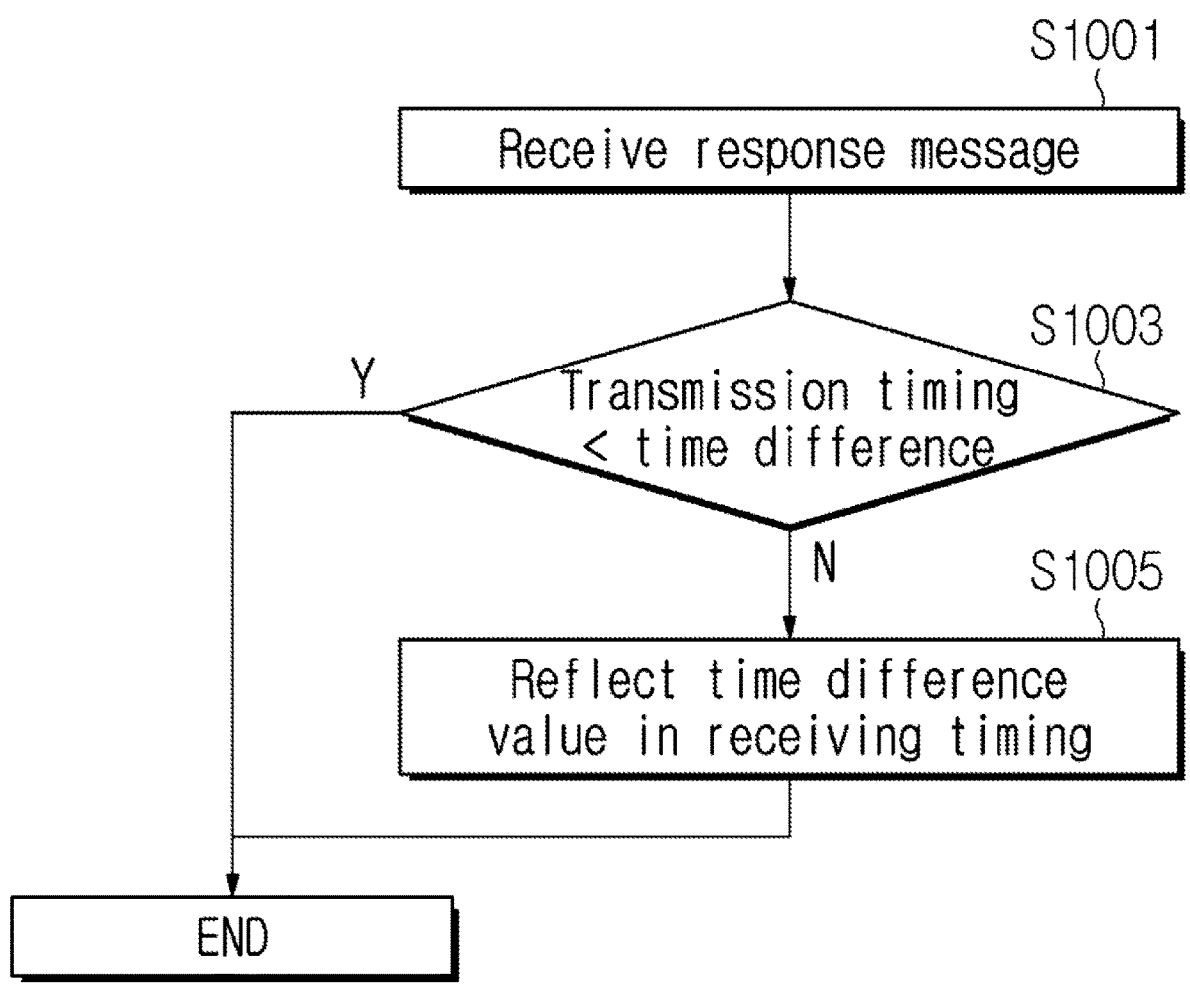
FIG. 10 is a view illustrating an example of a terminal operation procedure that is applicable to the present disclosure.

FIG. 10 is a view illustrating an example of a terminal operation procedure that is applicable to the present disclosure. At step S1001, a Tx terminal may receive a response message. At step S1003, the Tx terminal may compare Tx timing and a time difference value. As an example, in case the time difference value is greater than the Tx timing, the Tx terminal may not reflect the time difference value. At step S1005, in case the time difference value is smaller than the Tx timing, the Tx terminal may reflect the time difference value in Rx timing.

Figure 11A:
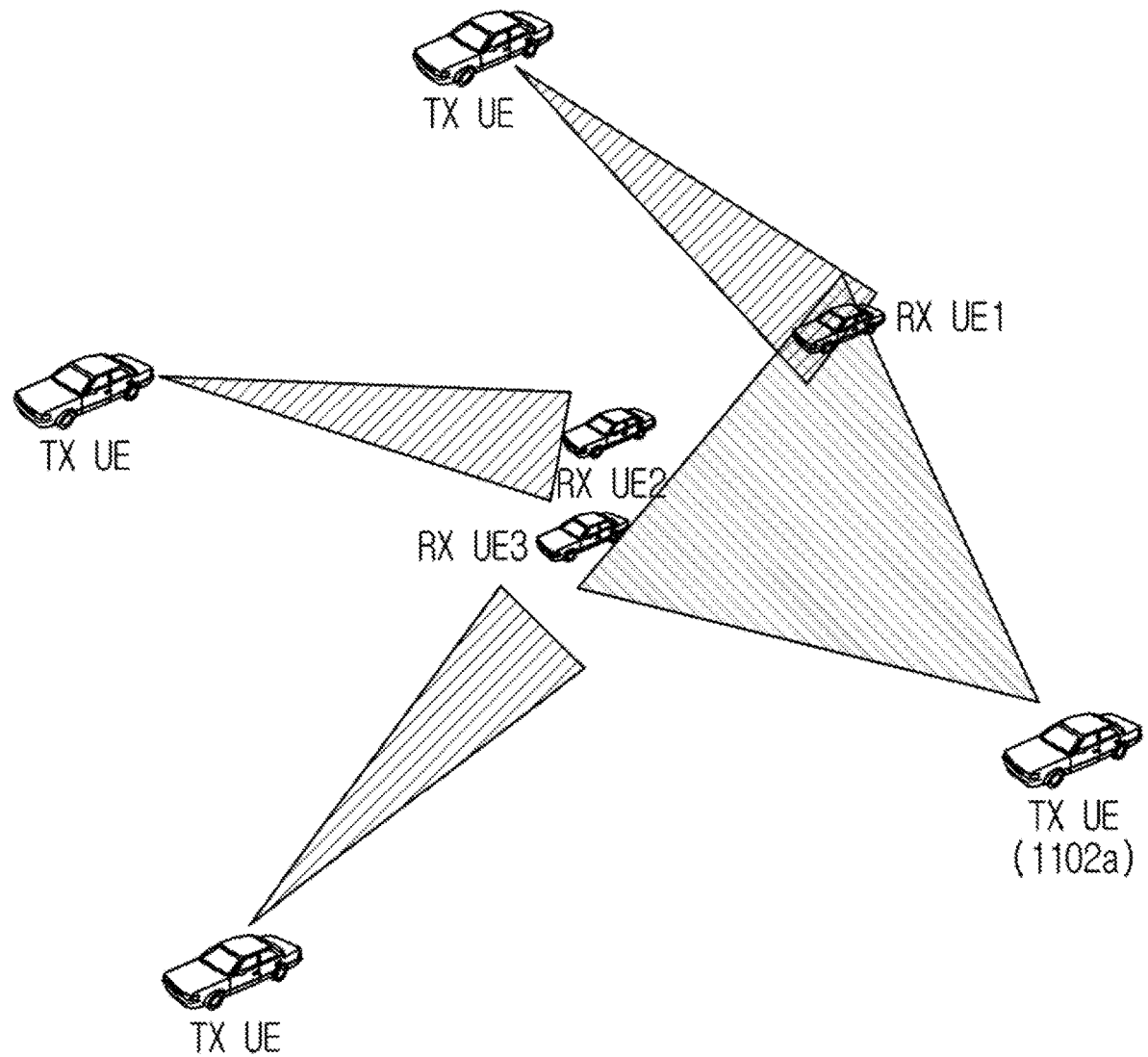
FIG. 11A and FIG. 11B are views illustrating an operation of a terminal that is applicable to the present disclosure.
Figure 11B:
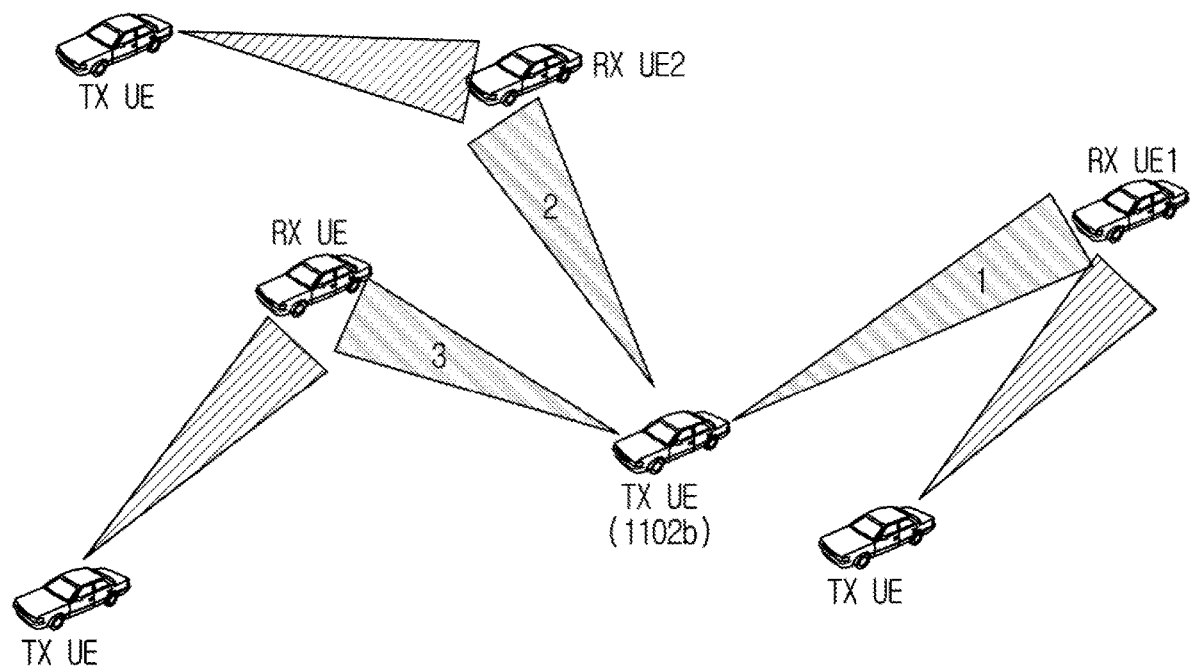

FIG. 11A and FIG. 11B are views illustrating an operation of a terminal that is applicable to the present disclosure. Referring to FIG. 11A, a Tx terminal 1102*a* may configure Rx timing of different times for each of a plurality of Rx terminals. The Tx terminal 1102 and Rx terminals may be aligned in a single beam. After transmitting an SSB, the Tx terminal 1102*a* may receive a response message from a plurality of Rx terminals. Referring to FIG. 11A, a time differential may be different for each Rx terminal. A Tx terminal may receive a response message based on a foremost time differential unless a beam of each Rx terminal is independently operated through beam refinement. That is, a Tx terminal may receive a response message based on a foremost time differential, when it transmits data to a plurality of Rx terminals simultaneously and receives a plurality of feedback messages like in groupcast.

Referring to FIG. 11B, a Tx terminal 1102*b* may configure receiving timing of different times for each of a plurality of Rx terminals. The Tx terminal 1102*b* and Rx terminals may be aligned in different beams. The Tx terminal 1102*b* may receive a response message from Rx terminals that are aligned in different beams. A minimum scheduling unit of a Tx terminal may be a slot. Accordingly, a Tx terminal cannot modify a beam within 1 slot. The Tx terminal 1102*b* may not set in advance when beam switching. As an example, an order of Rx terminal 1 1104→Rx terminal 3 1108→Rx terminal 2 1106 may be configured. A Tx terminal may set and use a foremost time difference value.

Figure 12:
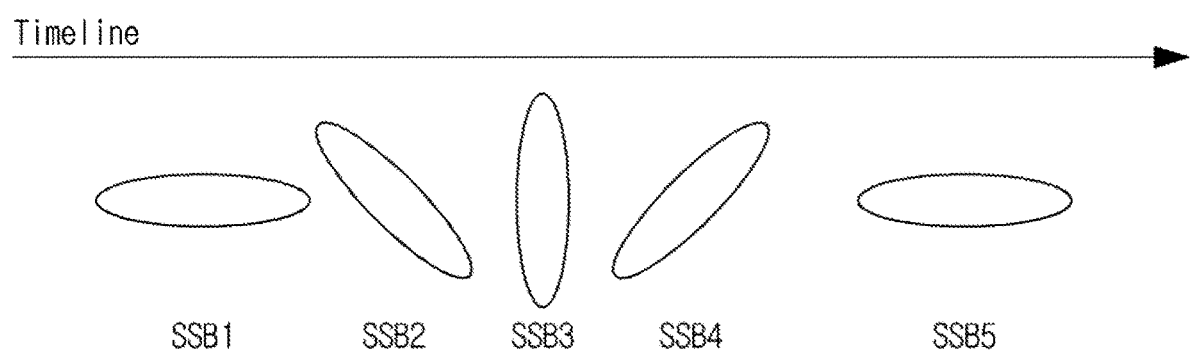
FIG. 12 is a view illustrating an example of an operation of a terminal that is applicable to the present disclosure.

FIG. 12 is a view illustrating an example of an operation of a terminal that is applicable to the present disclosure. For sidelink transmission, a terminal needs to set a reference time with another terminal. When an upper layer requests data transmission, a terminal may transmit SLSS/PBCH and then perform resource sensing and PSCCH transmission for transmitting data. In the case of mmWave, an SSB may be mapped in each beam whenever a terminal transmits SLSS/PBCH. When receiving this, a terminal may perform an operation for in-line beam alignment like random access channel (RACH). After beam alignment, a terminal may perform an operation of allocating a resource for data transmission. As an example, a terminal may perform resource channel sensing. However, due to the feature of mmWave, a terminal may form a directional beam. Accordingly, the terminal may have a limitation in measuring a channel environment for neighbor terminals. To solve this problem, the terminal may perform an additional operation. The present disclosure proposes a method of minimizing the delay of such an additional operation. As an example, in order to minimize the delay, the present disclosure may add an initial resource reservation process to an operation for transmitting SLSS/PBCH by a terminal. Referring to FIG. 12, a terminal may transmit SLSS/PBCH in each of different beams due to beam features. A terminal may perform such beam transmission periodically. By using periodicity, a Rx terminal may find a period in which it can receive data. In addition, the Rx terminal may transmit, to the Tx terminal, a response message for notifying that it can receive data during the period. The Tx terminal may receive the response message and confirm the reception period. After confirming the reception period, the Tx terminal may transmit a PSCCH for initial data transmission. Thus, terminals may efficiently allocate resources.

Figure 13A:
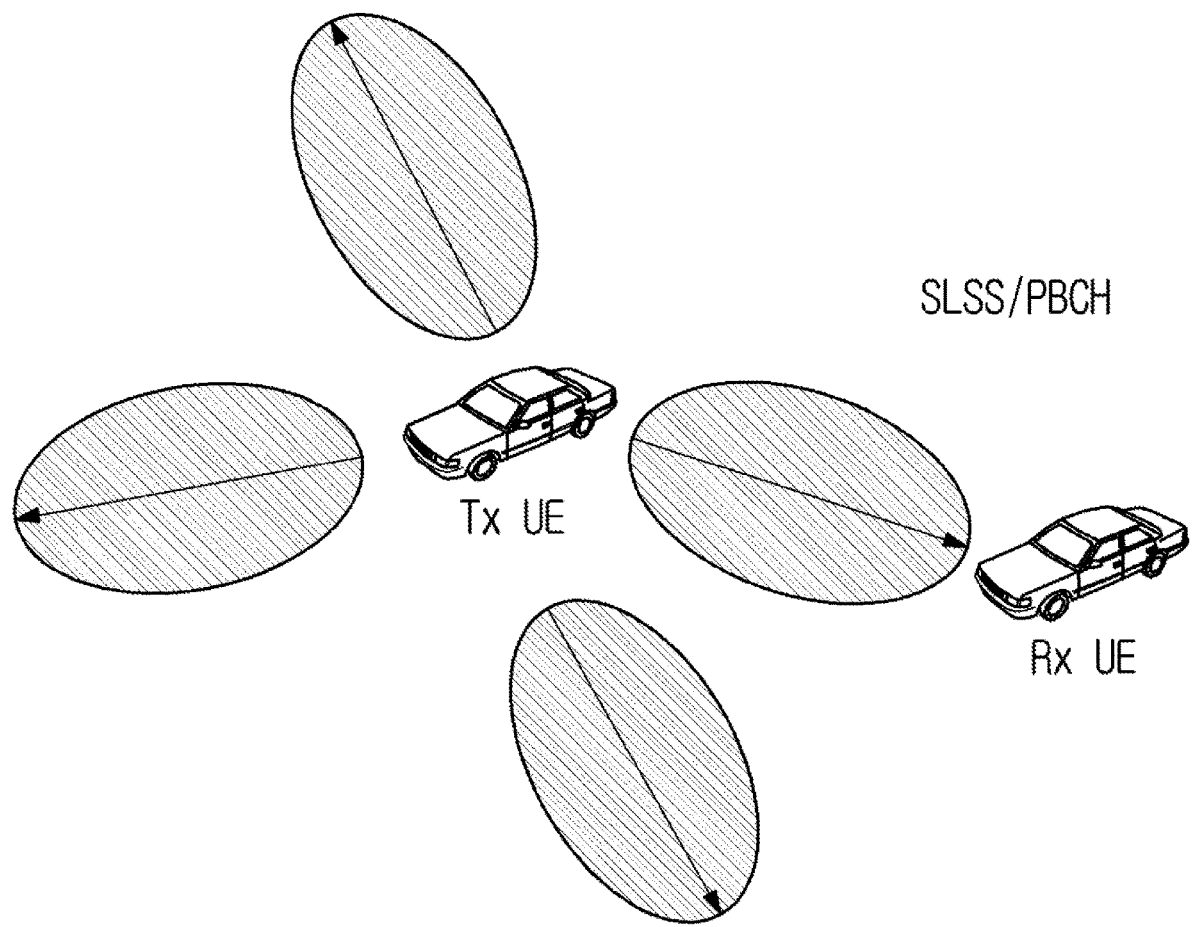
FIG. 13A to FIG. 13D are views illustrating an operation of a terminal that is applicable to the present disclosure.

FIG. 13A to FIG. 13D are views illustrating an operation of a terminal that is applicable to the present disclosure. A Tx terminal may receive a data transmission request from an upper layer. In addition, the Tx terminal may have a sync reference. Referring to FIG. 13A, a TX terminal (UE) may transmit an SLSS and a PBCH to a Rx terminal (UE). As an example, a Tx terminal may broadcast an SLSS and a PBCH to search for a neighbor Rx terminal. The SLSS may be a channel that enables a Rx terminal to know reference timing of a Tx terminal. The PBCH may be a channel for transmitting a master information block (MIB) sidelink message. The MIB may include a frame boundary, information regarding whether in or out of coverage, slot time division duplexing (TDD) config information and the like. MIB message contents may be as follows.

```
MasterInformationBlockSidelink ::= SEQUENCE {
    sl-TDD-Config-r16 BIT STRING (SIZE (12)),
    inCoverage-r16 BOOLEAN,
    directFrameNumber-r16 BIT STRING (SIZE (10)),
    slotIndex-r16 BIT STRING (SIZE (7)),
    reservedBits-r16 BIT STRING (SIZE (2))
}
```

In addition, MIB may include the following contents. MIB may include an SSB period. As an example, the following SSB period information may be included.

SSB period={ms5, 10, 20 40, 80, 160}

SSB period is a parameter that enables a Rx terminal receiving a specific SSB to determine when it can receive the same SSB again.

In addition, MIB may include frequency range information. As an example, MIB may include the following used frequency range information.

Used frequency range={(start position=0 to 26, length=1 to 27) subchannel}

Used frequency range is a parameter that a Rx terminal can use to determine a frequency resource which it can receive.

In addition, MIB may include response period information. As an example, MIB may include the following response period information.

Response period={2,4,6,8}

Response period information may include slot timing information in which a Rx terminal can transmit an accepted data confirm message.

In addition, MIB may include message type information. As an example, MIB may include the following message type information.

Message Type={CAM=1, DANM=2, Broadcast=3}

CAM may mean an image type. DANM may mean a danger type.

Figure 13B:
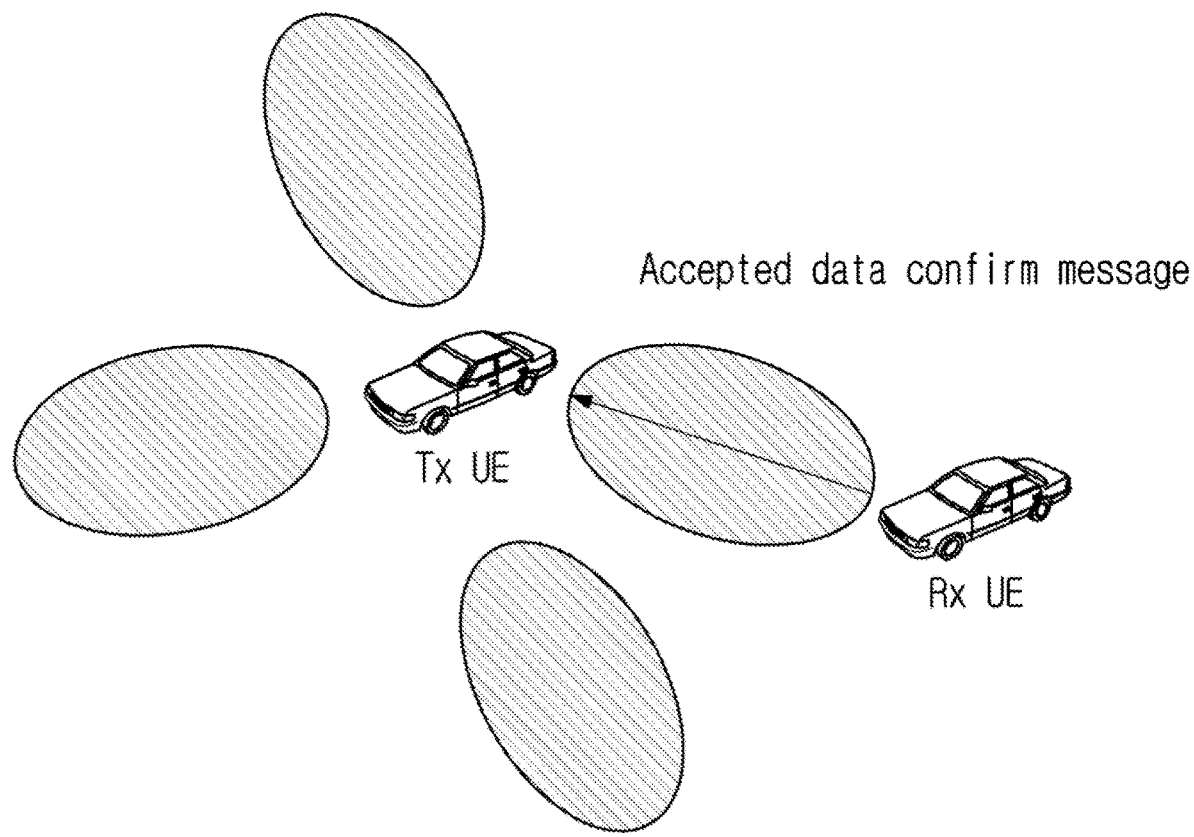

Referring to FIG. 13B, a Rx terminal may transmit an accepted data confirm message to a Tx terminal. The Rx terminal may perform synchronization with a Tx terminal through an SSB and a PBCH and know a size of a resource necessary for data that the Tx terminal will transmit. In addition, the Rx terminal may check a period of receiving from another terminal. Accordingly, the Rx terminal may perform scheduling to prevent an overlap with the period of receiving from another terminal. In addition, when receiving from another terminal through a beam aligned with a Tx terminal, the Rx terminal may perform scheduling to receive based on frequency division duplexing (FDD) or TDD.

An accepted data confirm message may include receiving timing information. That is, a Rx terminal may deliver receiving timing information by including it in an accepted data confirm message. The Rx terminal may send an accepted data confirm message after a response period from a time of receiving an SSB. The terminal may transmit the accepted data confirm message through a PSSCH. The Rx terminal may transmit the accepted data confirm message at a timing based on a message received from a Tx terminal. As an example, the Rx terminal may transmit the accepted data confirm message based on frequency range information and time period information which are received from a Tx terminal. As a more concrete example, the Rx terminal may transmit the accepted data confirm message based on used frequency range information and response period information that are included in MIB.

The accepted data confirm message may have the following format.

```
Accepted data confirm message::= SEQUENCE {
    sl-TDD-Slot-Config = slot position to start receiving
    TDD slot period = slot period for reservation
    Accepted frequency range = frequency position where reception can be allowed (start position, length)
}
```

Figure 13C:
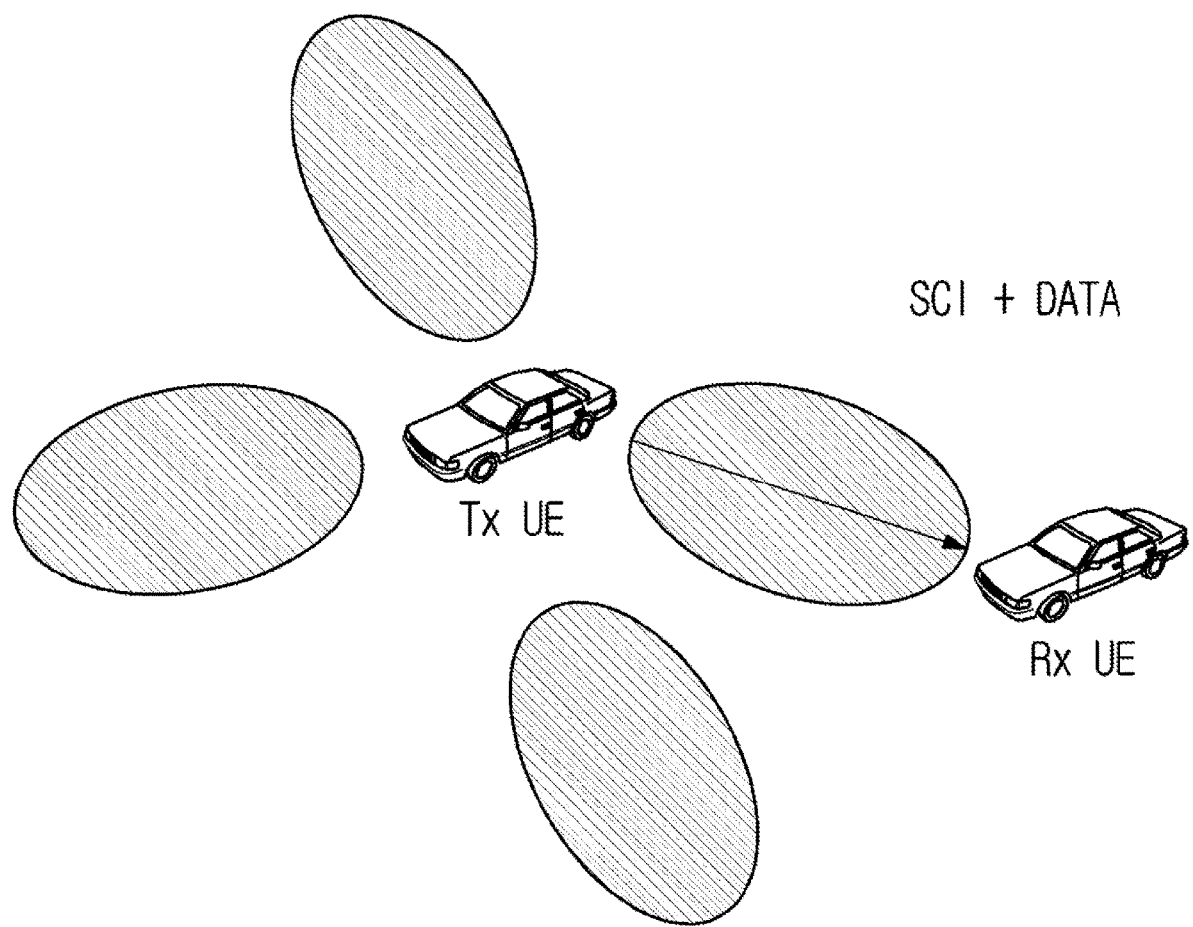

The Tx terminal may receive the accepted data confirm message. The Tx terminal may determine a resource position and timing for transmitting data based on the accepted data confirm message. Referring to FIG. 13C, a Tx terminal may transmit sidelink control information (SCI) and transmit data to the Rx terminal. In addition, the Tx terminal may transmit SCI and data to the Rx terminal.

Figure 13D:
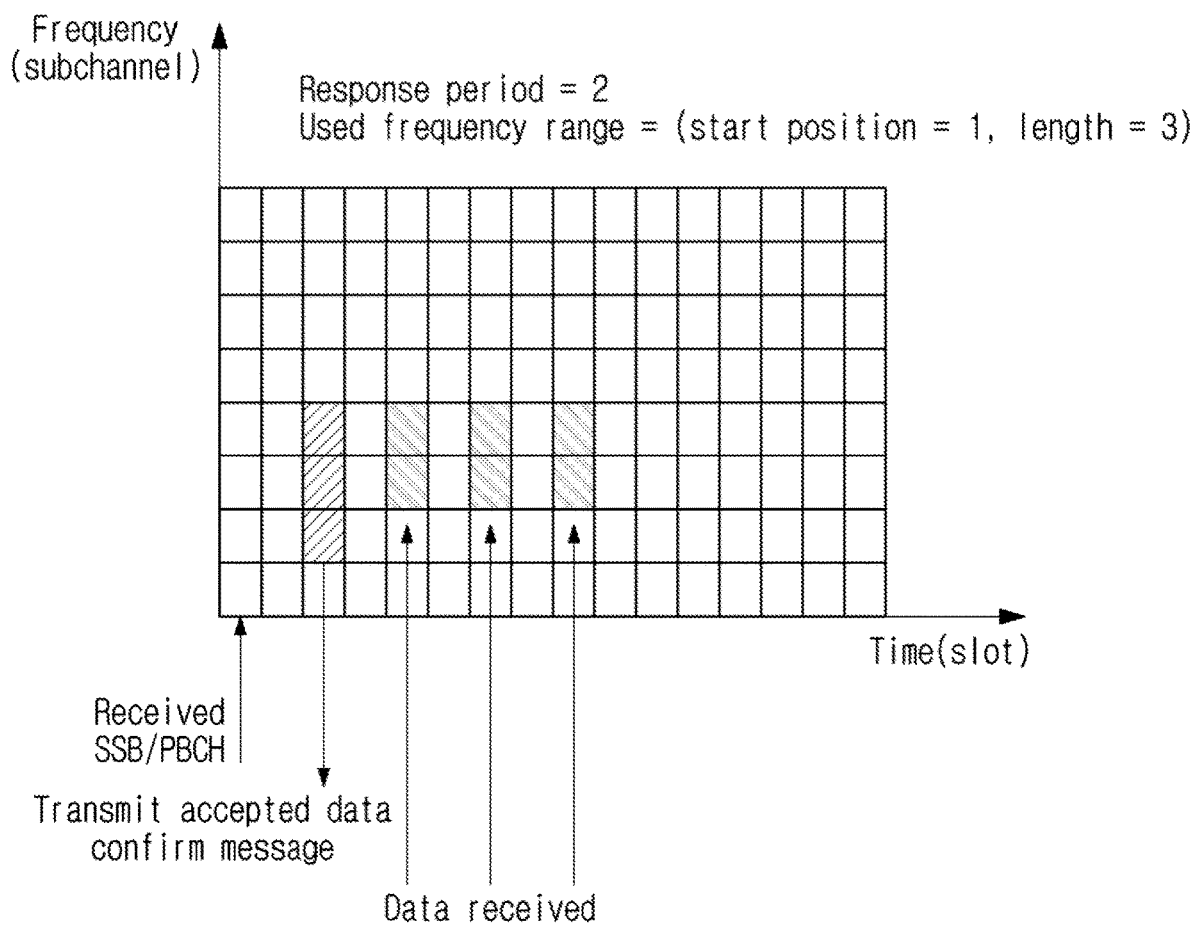

FIG. 13D is a view illustrating an example of a terminal operation. Referring to FIG. 13D, a Rx terminal may receive an SSB and a PBCH. The Rx terminal may receive MIB through the PBCH. The Rx terminal may receive information on a response period and a used frequency range which is included in the MIB. In the case of FIG. 13D, response period=2, and used frequency range=(start position=1, length=3). The Rx terminal may transmit an accepted data confirm message to a Tx terminal based on response period=2 and used frequency range=(start position=1, length=3). The Tx terminal may transmit data to the Rx terminal based on the accepted data confirm message.

Figure 14A:
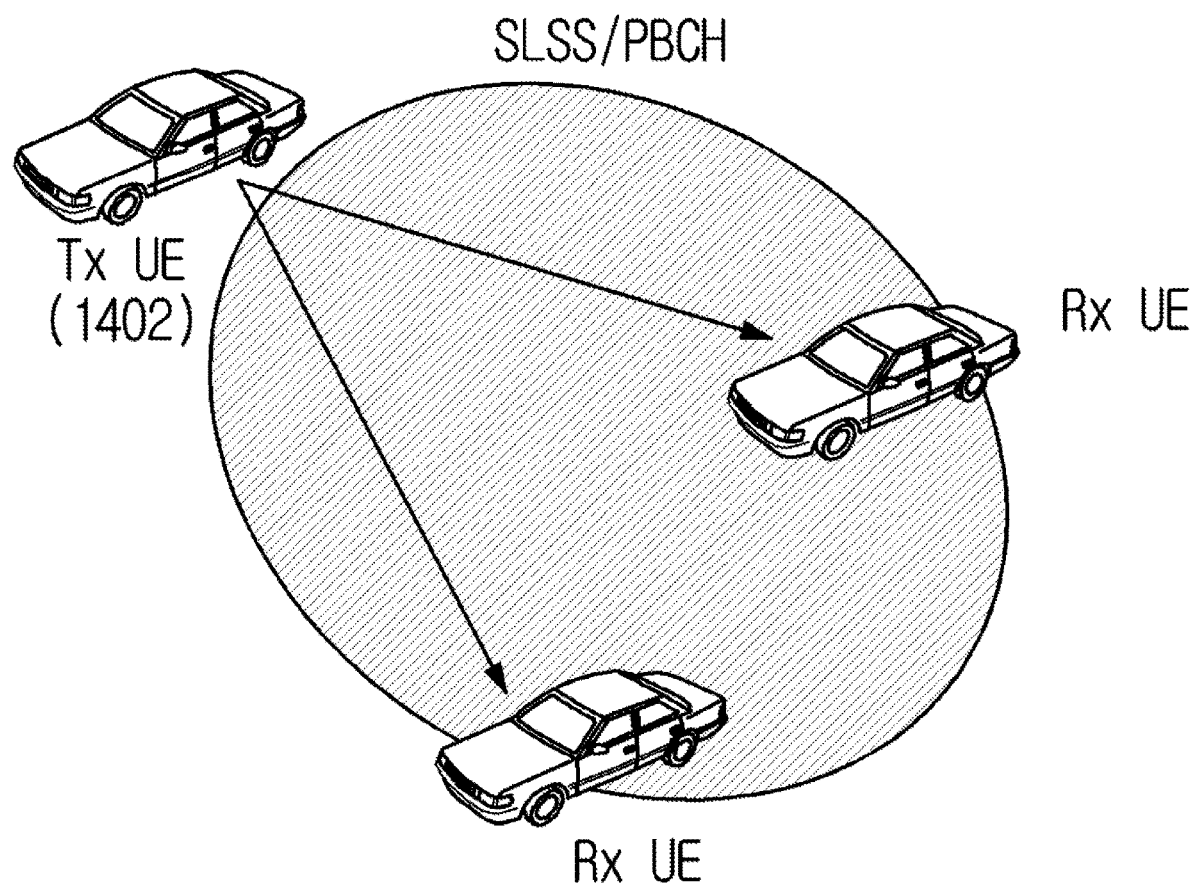
FIG. 14A and FIG. 14B are views illustrating an example of an operation of a terminal that is applicable to the present disclosure.
Figure 14B:
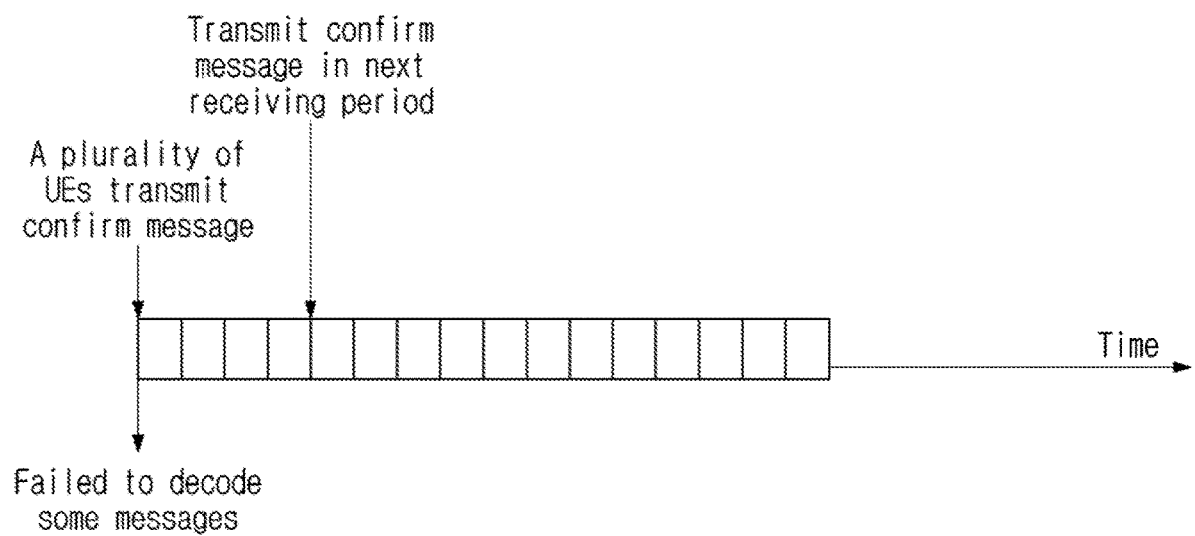

FIG. 14A and FIG. 14B are views illustrating an example of an operation of a terminal that is applicable to the present disclosure. Referring to FIG. 14A, a single beam transmitted by a Tx terminal 1402 may be received by a plurality of Rx terminals. A beam, which transmits an SLSS and a PBCH, may have a high probability to cover a comparatively wide range. Accordingly, a plurality of Rx terminals may receive an SSB.

Rx terminals, which receives an SSB by a same beam, may indicate a same frequency resource. A terminal, which receives a PBCH, may know a range of a resource to be transmitted by a Tx terminal based on used frequency range information. As an example, in case a used frequency range is 5 sub-carriers, two Rx terminals may inform a Tx terminal of a period in which 5 sub-carriers can be received. A transmission channel may be a PSSCH or a PSCCH. Resources for transmitting accepted data confirm messages transmitted by Rx terminals may overlap with each other. In this case, the Tx terminal may receive only one of overlapping accepted data confirm messages or may receive none of the messages. When the Tx terminal does not receive the accepted data confirm message, the Rx terminal may not receive data at a start slot where data is expected to be received. When the Rx terminal does not receive data, the Rx terminal may transmit the accepted data confirm message to the Tx terminal again by randomly performing backoff. Referring to FIG. 14B, a plurality of Rx terminals may transmit an accepted data confirm message. The Tx terminal may fail to decode some messages. Rx terminals, which do not receive data, may transmit an accepted data confirm message in a next reception period. A Rx terminal may transmit the accepted data confirm message through a PSSCH. In this case, the Rx terminal may check, through a sensing window, a state in which the Tx terminal transmits to the Rx terminal. Accordingly, the Rx terminal may allocate a resource by avoiding collision of resources.

Rx terminals, which receives an SSB by a same beam, may indicate a same time resource. A terminal, which receives a PBCH, may know timing of transmitting the accepted data confirm message based on SSB period information and response period information. The Tx terminal may succeed in decoding a plurality of accepted data confirm messages at the timing. When succeeding in the decoding, the Tx terminal may transmit data to a plurality of Rx terminals at same timing through groupcast.

Figure 15A:
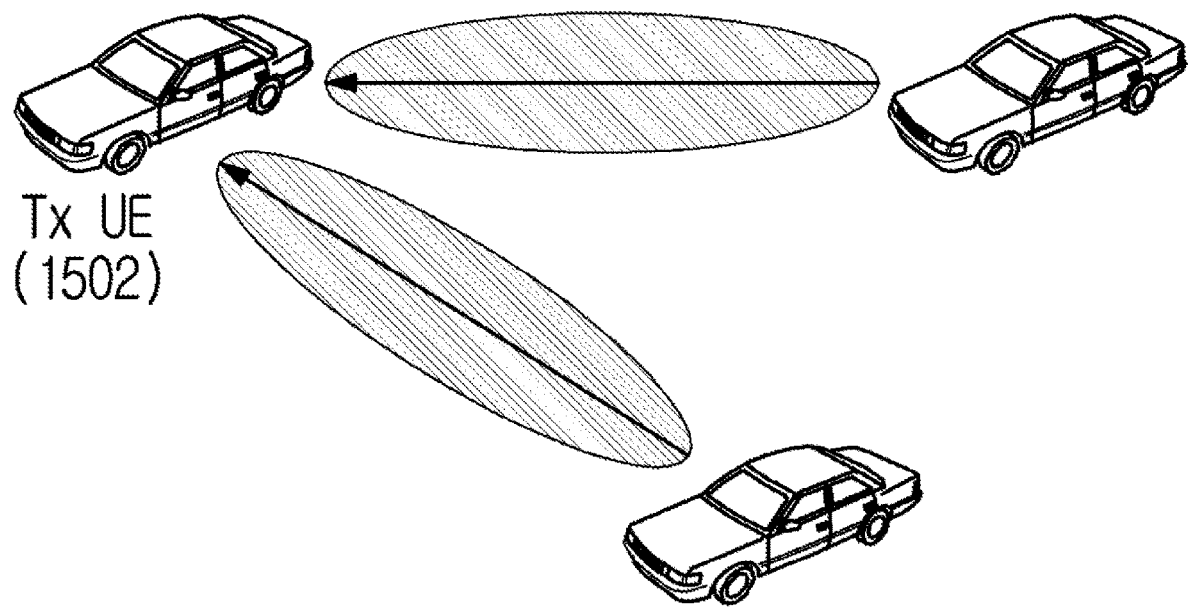
FIG. 15A and FIG. 15B are views illustrating an example of an operation of a terminal that is applicable to the present disclosure.
Figure 15B:
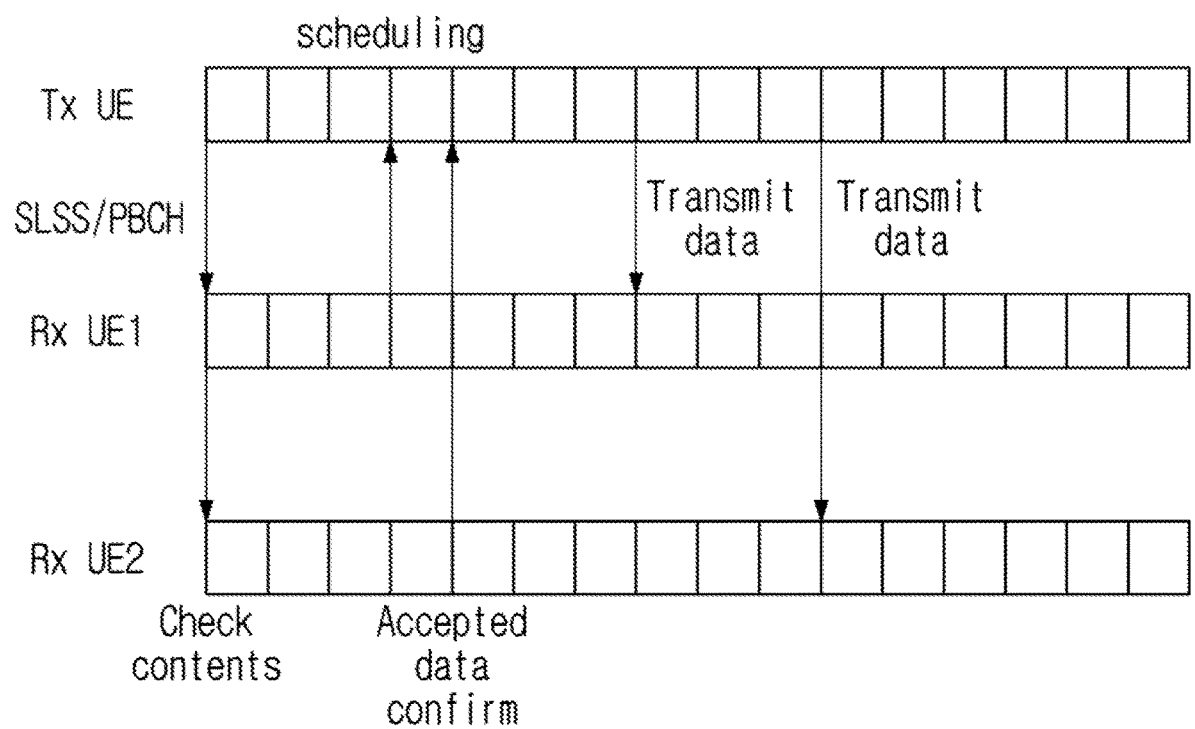

FIG. 15A and FIG. 15B are views illustrating an example of an operation of a terminal that is applicable to the present disclosure. A Tx terminal 1502 may transmit an SLSS and a PBCH to a plurality of Rx terminals by using a plurality of beams. The Tx terminal may broadcast the SLSS and the PBCH. Rx terminals may receive a reference signal and data of the Tx terminal. Each of the Rx terminals may transmit the above-described accepted data confirm message. The Tx terminal may receive the accepted data confirm message.

As an example, Rx terminals may transmit an accepted data confirm message simultaneously. However, the Tx terminal may not receive the accepted data confirm message transmitted at same timing due to a beam characteristic. Rx terminals may transmit the accepted data confirm message before periodically receiving user data. In addition, when Rx terminals confirm accepted data after a predetermined time, the Tx terminal may have an opportunity to transmit data at a same time. The Tx terminal may alternately transmit data to Rx terminals one after another. Referring to FIG. 15B, a transmission timing period for a Tx terminal to transmit data to a Rx terminal 1 may be 4. A transmission timing period for a Tx terminal to transmit data to a Rx terminal 2 may be 3. The Rx terminal 1 and the Rx terminal 2 may transmit an accepted data confirm message at different times. In addition, a transmission time of data transmitted by the Tx terminal based on an accepted data confirm message received from the Rx terminal 1 may overlap with a transmission time of data transmitted by the Tx terminal based on an accepted data confirm message received from the Rx terminal 2. In case the data transmission times overlap with each other, the Tx terminal may transmit data to a terminal with a later next transmission period first, not to a terminal with an earlier next transmission period. In the case of FIG. 15B, since a transmission period of the Rx terminal is greater than that of the Rx terminal 2, the Tx terminal may transmit data to the Rx terminal 1 first.

Figure 16:
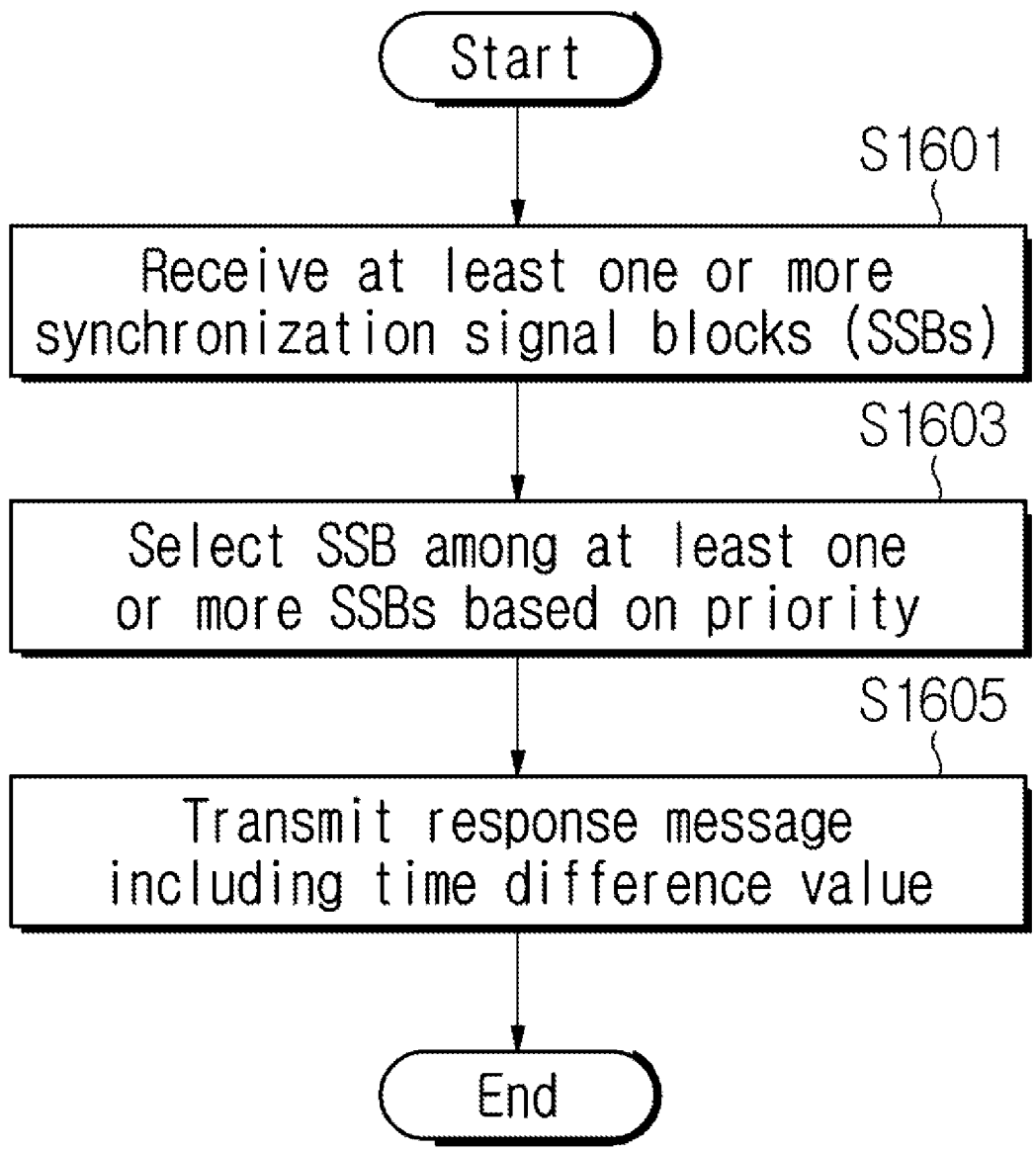
FIG. 16 is a view illustrating an example of a terminal operation procedure that is applicable to the present disclosure.

FIG. 16 is a view illustrating an example of a terminal operation procedure that is applicable to the present disclosure.

At step S1601, a terminal may receive at least one or more SSBs. As an example, the terminal may receive a plurality of SSBs from a plurality of terminals. That is, a Rx terminal may receive a plurality of SLSSs and PBCHs from a plurality of Tx terminals.

Meanwhile, a PBCH may be a channel for transmitting a master information block (MIB) sidelink message. The MIB may include a frame boundary, information regarding whether in or out of coverage, slot time division duplexing (TDD) config information and the like. MIB message contents may be as follows.

```
MasterInformationBlockSidelink ::= SEQUENCE {
    sl-TDD-Config-r16 BIT STRING (SIZE (12)),
    inCoverage-r16 BOOLEAN,
    directFrameNumber-r16 BIT STRING (SIZE (10)),
    slotIndex-r16 BIT STRING (SIZE (7)),
    reservedBits-r16 BIT STRING (SIZE (2))
}
```

In addition, MIB may include the following contents. MIB may include an SSB period. As an example, the following SSB period information may be included.
SSB period={ms5, 10, 20 40, 80, 160}
SSB period is a parameter that enables a Rx terminal receiving a specific SSB to determine when it can receive the same SSB again.

In addition, MIB may include frequency range information. As an example, MIB may include the following used frequency range information.
Used frequency range={(start position=0 to 26, length=1 to 27) subchannel}
Used frequency range is a parameter that a Rx terminal can use to determine a frequency resource which it can receive.

In addition, MIB may include response period information. As an example, MIB may include the following response period information.
Response period={2,4,6,8}
Response period information may include slot timing information in which a Rx terminal can transmit an accepted data confirm message.

In addition, MIB may include message type information. As an example, MIB may include the following message type information.
Message Type={CAM=1, DANM=2, Broadcast=3}
CAM may mean an image type. DANM may mean a danger type.

At step S1603, the terminal may select an SSB among at least one or more SSBs based on a priority order. A Rx terminal may select an SSB of a Tx terminal based on a sync source priority. The Rx terminal may decode a PBCH and configure timing based on the SSB of the Tx terminal. Based on one sync source, the Rx terminal may receive data from a terminal that does not have the sync source. However, when the Rx terminal transmits a feedback message, the Rx terminal may transmit the feedback message based on a sync source. Accordingly, a Tx terminal without that sync source may not receive the feedback message.

When a Rx terminal receives an SSB from two Tx terminals, the Rx terminal may select an SSB with a higher priority between an SSB of a Tx terminal 1 and an SSB of a Tx terminal 2. The Rx terminal may derive a sync time value of the selected SSB. The sync time value may be determined in millisecond units. The Rx terminal may receive an SSB at 160 msec intervals. In addition, the Rx terminal may receive an SSB within 5 msec at 160 msec intervals. Accordingly, a terminal may determine up to 5 msec as a sync time value.

A Rx terminal may exclude an SSB on a boundary after a sync time of a selected SSB. For example, when a Rx terminal selects SSB=1 msec and SSB=2 msec has a next priority, the Rx terminal may exclude the SSB with the next priority. Even when the Rx terminal excludes the SSB with next priority, if decoding is successful, there may be no problem with sending feedback.

At step S1605, a terminal may transmit a response message including a time difference value. Based on a selected SSB, the Rx terminal may calculate a time difference value from remaining SSBs. For example, when a terminal receives 3 SSBs, the terminal may calculate time difference values among a best SSB, a second SSB, and a third SSB. The Rx terminal may transmit time difference values to terminals that transmit SSBs. The Rx terminal may transmit a response message to Tx terminals. A response message transmitted by the Rx terminal may include a time difference value. The Rx terminal may transmit a response message through a physical sidelink control channel (PSCCH) or a physical sidelink shared channel (PSSCH). The response message may be a hybrid automatic repeat request (HARQ) feedback message.

Timing for the Rx terminal to transmit a response message may be calculated by (high priority SSB sync time—low priority SSB sync time)/(total SSB number). Transmission timing of the response message may be determined based on the time difference value and the number of received SSBs. Referring to FIG. 9, a Rx terminal may calculate timing of transmitting a response message by (time difference between second SSB and best SSB+time difference between third SSB and best SSB)/2. That is, the Rx terminal may transmit a response message by pulling or pushing as much as an average time difference value. As an example, the Rx terminal may determine transmission timing of the response message based on the time difference value and transmit the response message to a terminal that transmits an SSB with a low priority. Accordingly, the terminal, which transmits the SSB with a low priority, may also receive and decode the response message.

A message format may include every time difference value. The Rx terminal may transmit a response message by using appointed timing as slot-unit transmission timing. As an example, the Rx terminal may receive an SSB and then transmit a response message after 2 slots. A resource block of the response message may be randomly determined. For example, the Rx terminal may randomly determine and transmit a resource block area.

Meanwhile, a terminal, which transmits an SSB, may need a unique ID to know a time difference value or differential value of the SSB transmitted by it. A time difference value or differential sync may be an SSB ID. In addition, a time difference value or differential sync may be an identifier of a specific terminal. That is, a time difference value or differential sync may be a UE ID. SSB ID may be expressed by SSB #.

As an example, a Tx terminal with an ID of SSB3 may receive a response message. After receiving the response message, the Tx terminal may confirm that there is a 1 ms difference from downlink sync or sidelink sync of a terminal receiving SSB. Next, the Tx terminal may perform a configuration operation so that it can transmit data and after 1 ms receive a corresponding feedback message.

Meanwhile, the response message may include an accepted data confirm message. For example, a Rx terminal may transmit an accepted data confirm message to a Tx terminal. The Rx terminal may perform synchronization with a Tx terminal through an SSB and a PBCH and know a size of a resource necessary for data that the Tx terminal will transmit. In addition, the Rx terminal may check a period of receiving from another terminal. Accordingly, the Rx terminal may perform scheduling to prevent an overlap with the period of receiving from another terminal. In addition, when receiving from another terminal through a beam aligned with a Tx terminal, the Rx terminal may perform scheduling to receive based on frequency division duplexing (FDD) or TDD.

An accepted data confirm message may include receiving timing information. That is, a Rx terminal may deliver receiving timing information by including it in an accepted data confirm message. The Rx terminal may send an accepted data confirm message after a response period from a time of receiving an SSB. The terminal may transmit the accepted data confirm message through a PSSCH. The Rx terminal may transmit the accepted data confirm message at a timing based on a message received from a Tx terminal. As an example, the Rx terminal may transmit the accepted data confirm message based on frequency range information and time period information which are received from a Tx terminal. As a more concrete example, the Rx terminal may transmit the accepted data confirm message based on used frequency range information and response period information that are included in MIB.

The accepted data confirm message may have the following format.

```
Accepted data confirm message::= SEQUENCE {
sl-TDD-Slot-Config = slot position to start receiving
TDD slot period = slot period for reservation
Accepted frequency range = frequency position where reception can be
allowed (start position, length)
}
```

Figure 17:
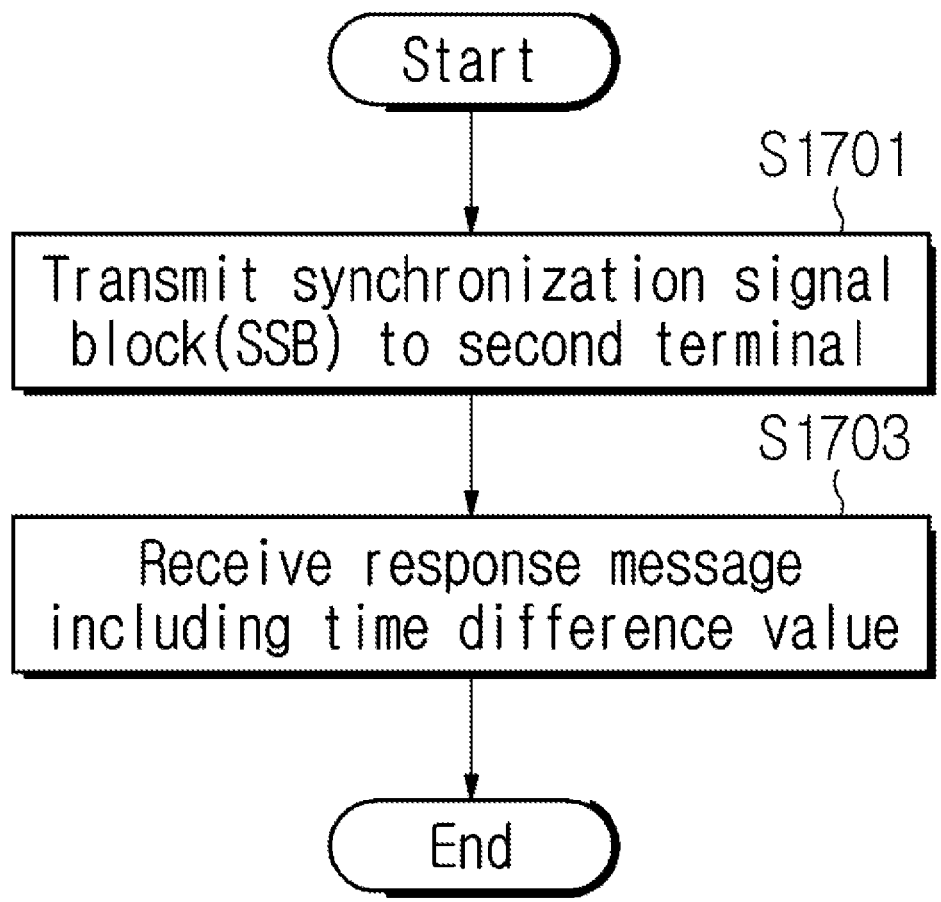
FIG. 17 is a view illustrating an example of a terminal operation procedure that is applicable to the present disclosure.

FIG. 17 is a view illustrating an example of a terminal operation procedure that is applicable to the present disclosure.

At step S1701, a first terminal may transmit an SSB to a second terminal. That is, the first terminal may transmit an SLSS and a PBCH to the second terminal. As an example, the second terminal may receive a plurality of SSBs not only from the first terminal but also from a plurality of terminals. That is, the second terminal may receive a plurality of SLSSs and PBCHs from a plurality of Tx terminals.

At step S1703, the first terminal may receive a response message including a time difference value from the second terminal. The second terminal may receive at least one or more SSBs and select an SSB based on a priority order. As an example, like at step S1603 of FIG. 16, the second terminal may select an SSB. In addition, like at step S1605 of FIG. 16, the second terminal may transmit a response message including a time difference value to the first terminal.

When receiving the response message, the first terminal may update Rx time. The first terminal may receive the response message and compare Tx timing and a time difference value. As an example, in case the time difference value is greater than the Tx timing, the first terminal may not reflect the time difference value. In case the time difference value is smaller than the Tx timing, the first terminal may reflect the time difference value in Rx timing.

In addition, the first terminal may transmit an SSB to a plurality of Rx terminals. The first terminal may configure receiving timing of different times for each of a plurality of Rx terminals. Referring to FIG. 11A, the first terminal and Rx terminals may be aligned in a single beam. After transmitting an SSB, the first terminal may receive a response message from a plurality of Rx terminals. A time differential may be different for each Rx terminal. The first terminal may receive a response message based on a foremost time differential unless a beam of each Rx terminal is independently operated through beam refinement. That is, the first terminal may receive a response message based on a foremost time differential, when it transmits data to a plurality of Rx terminals simultaneously and receives a plurality of feedback messages like in groupcast.

Referring to FIG. 11B, the first terminal may configure receiving timing of different times for each of a plurality of Rx terminals. The first terminal and Rx terminals may be aligned in different beams. The first terminal may receive a response message from Rx terminals that are aligned in different beams. A minimum scheduling unit of a Tx terminal may be a slot. Accordingly, a Tx terminal cannot modify a beam within 1 slot. The first terminal may not set in advance when beam switching. As an example, the first terminal may configure an order of Rx terminal 1 1104→Rx terminal 3 1108→Rx terminal 2 1106. The first terminal may set and use a foremost time difference value.

Meanwhile, the first terminal may receive an accepted data confirm message. The first terminal may determine a resource position and timing for transmitting data based on the accepted data confirm message. The first terminal may transmit sidelink control information (SCI) and transmit data to the Rx terminal. In addition, the first terminal may transmit SCI and data together to the Rx terminal.

Figure 18:
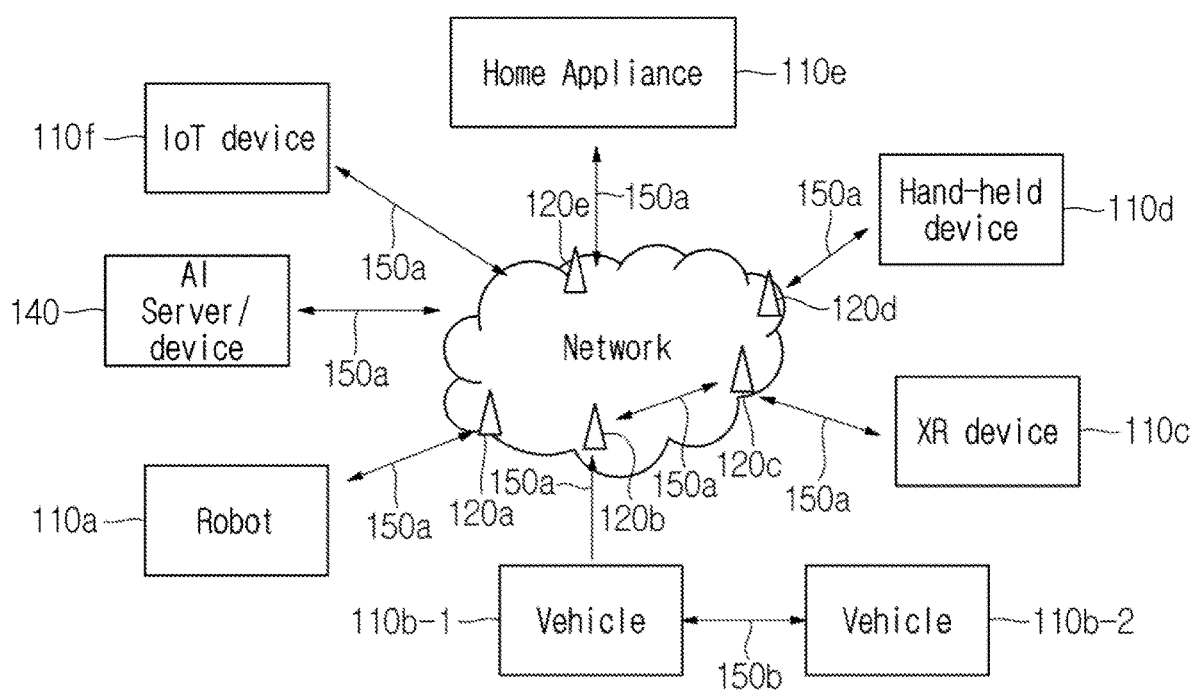
FIG. 18 illustrates an example of a communication system according to an embodiment of the present disclosure.

FIG. 18 illustrates an example of a communication system according to an embodiment of the present disclosure. An embodiment of FIG. 18 may be combined with various embodiments of the present disclosure.

Referring to FIG. 18, a communication system, which is applicable to the present disclosure, includes a wireless device, a base station, and a network. Herein, the wireless device means a device, which performs communication using a radio access technology (e.g., 5G NR, LTE), and may be referred to as communication/radio/5G device. The wireless device may include, without being limited to, at least one of a robot 110a, vehicles 110b-1 and 110b-2, an extended reality (XR) device 110c, a hand-held device 110d, a home appliance 110e, an Internet of Things (IoT) device 110f, and an artificial intelligence (AI) device/server 110g. For example, the vehicles may include a vehicle having a wireless communication function, an autonomous vehicle, and a vehicle capable of performing vehicle-to-vehicle communication. Herein, the vehicles 110b-1 and 110b-2 may include an unmanned aerial vehicle (UAV) (e.g., a drone). The XR device 110c may include an augmented Reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device 110d may include a smartphone, a smartpad, a wearable device (e.g., a smartwatch or a smartglasses), and a computer (e.g., a notebook). The home appliance 110e may include a TV, a refrigerator, and a washing machine. The IoT device 110f may include a sensor and a smartmeter. For example, the base stations 120a to 120e and the network may be implemented as wireless devices and a specific wireless device 120a may operate as a base station/network node with respect to other wireless devices.

Here, wireless communication technology implemented in the wireless devices 110a to 110f of this disclosure may include not only LTE, NR and 6G but also narrowband Internet of things for low-power communication. In this case, for example, NB-IoT technology may be an example of LPWAN (Low Power Wide Area Network) technology and may be implemented in the standard such as LTE Cat NB1 and/or LTE Cat NB2, without being limited to the above-described names. Additionally or alternatively, the wireless communication technology implemented in the wireless devices 100a to 100f of the present specification may perform communication based on the LTE-M technology. In this case, as an example, the LTE-M technology may be an example of an LPWAN technology, and may be called various names such as enhanced machine type communication (eMTC). For example, the LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, without being limited to the above-described names. Additionally or alternatively, the wireless communication technology implemented in the wireless devices 100a to 100f of the present specification may include at least any one of ZigBee, Bluetooth, and Low Power Wide Area Network (LPWAN) in consideration of low power communication, without being limited to the above-described names. For example, the ZigBee technology may create PAN (personal area networks) related to small/low-power digital communication based on various standards such as IEEE 802.15.4, and may be called by various names.

The wireless devices 100a to 100f may be connected to a network via the base stations 120a to 120e. An AI technology may be applied to the wireless devices 100a to 100f, and the wireless devices 100a to 100f may be connected to the AI server 110g via a network. The network may be configured using a 3G network, a 4G (e.g., LTE) network, or a 5G (e.g., NR) network. Although the wireless devices 100a to 100f may communicate with each other through the base stations 120a to 120e/network, the wireless devices 100a to 100f may perform direct communication (e.g., sidelink communication) with each other without the base stations 120a to 120e/network. For example, the vehicles 110b-1 and 110b-2 may perform direct communication (e.g., Vehicle-to-Vehicle (V2V)/Vehicle-to-everything (V2X) communication). In addition, the IoT device 110f (e.g., a sensor) may perform direct communication with other IoT devices (e.g., sensors) or other wireless devices 101a to 110f.

Wireless communication/connections 150a, 150b and 150c may be established between the wireless devices 110a to 110f and the base stations 120a to 120e and between the base stations 120a to 120e and the base stations 120a to 120e. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BS s/the wireless devices may transmit/receive radio signals to/from each other through the wireless communication/connections 150a and?150b. For example, the wireless communication/connections 150a and?150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
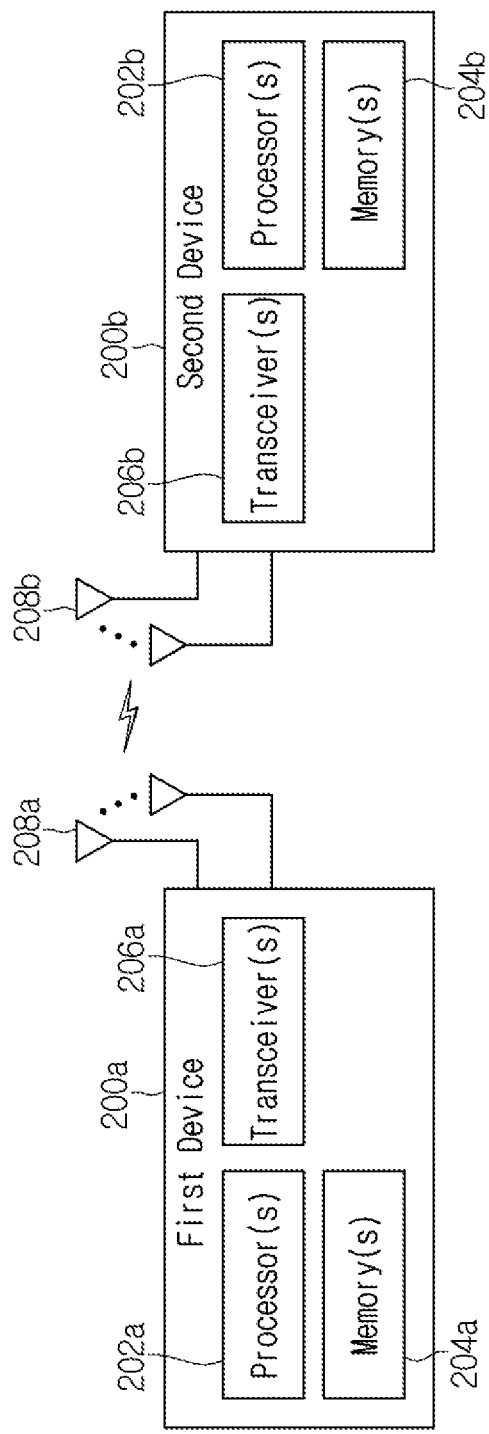
FIG. 19 illustrates an example of a wireless device according to an embodiment of the present disclosure.

FIG. 19 illustrates an example of a wireless device according to an embodiment of the present disclosure. An embodiment of FIG. 19 may be combined with various embodiments of the present disclosure.

Referring to FIG. 19, a first wireless device 200a and a second wireless device 200b may transmit and receive radio signals through various radio access technologies (e.g., LTE and NR). Herein, {the first wireless device 200a and the second wireless device 200b} may correspond to {the wireless device 110x and the base station 120x} and/or {the wireless device 110x and the wireless device 110x} of FIG. 18.

The first wireless device 200a may include one or more processors 202a and one or more memories 204a and additionally further include one or more transceivers 206a and/or one or more antennas 208a. The processor(s) 202a may control the memory(s) 204a and/or the transceiver(s) 206a and may be configured to implement the descriptions, functions, procedures, proposals, methods, and/or operational flowcharts disclosed in this document. For example, the processor(s) 202a may process information within the memory(s) 204a to generate first information/signals and then transmit radio signals including the first information/signals through the transceiver(s) 206a. In addition, the processor(s) 202a may receive radio signals including second information/signals through the transceiver 206a and then store information obtained by processing the second information/signals in the memory(s) 204a. The memory(s) 204a may be connected to the processor(s) 202a and may store various information related to operations of the processor(s) 202a. For example, the memory(s) 204a may store software code including commands for performing a part or the entirety of processes controlled by the processor(s) 202a or for performing the descriptions, functions, procedures, proposals, methods, and/or operational flowcharts disclosed in this document. Herein, the processor(s) 202a and the memory(s) 204a may be a part of a communication modem/circuit/chip designed to implement RAT (e.g., LTE or NR). The transceiver(s) 206a may be connected to the processor(s) 202a and transmit and/or receive radio signals through one or more antennas 208a. Each of the transceiver(s) 206a may include a transmitter and/or a receiver. The transceiver(s) 206a may be used interchangeably with a radio frequency (RF) unit. In the present disclosure, the wireless device may represent a communication modem/circuit/chip.

As an example, a first wireless device may be a terminal according to the present disclosure. Specifically, the terminal may include a transceiver and a processor coupled with the transceiver. The processor may control the transceiver to receive at least one or more synchronization signal blocks (SSBs). The processor may control the terminal to select an SSB among the at least one or more SSBs based on a priority order. The processor may control the transceiver to transmit response message including a time difference value. Herein, the time difference value may be calculated based on the selected SSB. Herein, the selected SSB may be an SSB with a high priority based on a synchronization source. Transmission timing of the response message may be determined based on the time difference value and the number of received SSBs.

As another example, the first wireless device may be a first terminal according to present disclosure. Specifically, a first wireless device may include a transceiver and a processor coupled with the transceiver. The processor may control the transceiver to transmit a synchronization signal block (SSB) to a second terminal. The processor may control the transceiver to receive a response message including a time difference value. The response message may include a time difference value that is calculated based on the SSB. The SSB may be an SSB with a low priority based on a synchronization source. Transmission timing of the response message may be determined based on the time difference value and the number of SSBs received by the second terminal.

As another example, the first wireless device may be a device including at least one memory and at least one processor functionally coupled with the at least one memory. Herein, the at least one processor may control the device to receive at least one or more synchronization signal blocks (SSBs). The at least one processor may control the device to select an SSB among the at least one or more SSBs based on a priority order. The at least one processor may control to transmit a response message including a time difference value. Herein, the time difference value may be calculated based on the selected SSB. The selected SSB may be an SSB with a high priority based on a synchronization source. Transmission timing of the response message may be determined based on the time difference value and the number of received SSBs.

The second wireless device 200b performs wireless communication with the first wireless device 200a, and includes one or more processors 202b and one or more memories 204b and may additionally include one or more transceivers 206b and/or one or more antennas 208b. The functions of the one or more processors 202b, one or more memories 204b, one or more transceivers 206b, and/or one or more antennas 208b are similar to the one or more processors 202a, one or more memories 204a, one or more transceivers 206a and/or one or more antennas 208a of the first wireless device 200a.

Hereinafter, hardware elements of the wireless devices 200a and 200b will be described more specifically. One or more protocol layers may be implemented by, without being limited to, the one or more processors 202a and 202b. For example, the one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). The one or more processors 202a and 202b may generate one or more protocol data units (PDUs), one or more service data units (SDUs), a message, control information, data or information according to the descriptions, functions, procedures, proposals, methods, and/or operational flowcharts disclosed in this document. The one or more processors 202a and 202b may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 206a and 206b. The one or more processors 202a and 202b may receive the signals (e.g., baseband signals) from the one or more transceivers 206a and 206b and acquire the PDUs, SDUs, messages, control information, data, or information according to the descriptions, functions, procedures, proposals, methods, and/or operational flowcharts disclosed in this document.

The one or more processors 202a and 202b may be referred to as controllers, microcontrollers, microprocessors, or microcomputers. The one or more processors 202a and 202b may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 202a and 202b. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 202a and 202b or stored in the one or more memories 204a and 204b so as to be driven by the one or more processors 202a and 202b. The descriptions, functions, procedures, proposals, methods, and/or operational flowcharts disclosed in this document may be implemented using firmware or software in the form of code, commands, and/or a set of commands.

As an example, the first wireless device may be a non-transitory computer-readable medium storing at least one instruction. The computer-readable medium may include the at least one instruction that is executable by a processor. The at least one instruction may instruct the computer-readable medium to receive information on a location of the computer-readable medium. The at least one instruction may instruct the computer-readable medium to receive at least one or more synchronization signal blocks (SSBs). The at least one instruction may instruct the computer-readable medium to select an SSB among the at least one or more SSBs based on a priority order. The at least one instruction may control the computer-readable medium to transmit a response message including a time difference value. Herein, the time difference value may be calculated based on the selected SSB. The selected SSB may be an SSB with a high priority based on a synchronization source. Transmission timing of the response message may be determined based on the time difference value and the number of received SSBs.

The one or more memories 204a and 204b may be connected to the one or more processors 202a and 202b and store various types of data, signals, messages, information, programs, code, instructions, and/or commands. The one or more memories 204a and 204b may be configured by a read only memory (ROM), a random access memory (RAM), an erasable programmable read only memory (EPROM), a flash memory, a hard drive, a register, a cash memory, a computer-readable storage media, and/or a combination thereof. The one or more memories 204a and 204b may be located inside and/or outside the one or more processors 202a and 202b. In addition, the one or more memories 204a and 204b may be connected to the one or more processors 202a and 202b through various technologies such as wired or wireless connection.

The one or more transceivers 206a and 206b may transmit user data, control information, and/or radio signals/channels, mentioned in the methods and/or operational flowcharts of this document, to one or more other devices. The one or more transceivers 206a and 206b may receive user data, control information, and/or radio signals/channels, mentioned in the descriptions, functions, procedures, proposals, methods, and/or operational flowcharts disclosed in this document, from one or more other devices. In addition, the one or more transceivers 206a and 206b may be connected to the one or more antennas 208a and 208b, and the one or more transceivers 206a and 206b may be configured to transmit and receive user data, control information, and/or radio signals/channels, mentioned in the descriptions, functions, procedures, proposals, methods, and/or operational flowcharts disclosed in this document, through the one or more antennas 208a and 208b. In this document, the one or more antennas may be a plurality of physical antennas or a plurality of logical antennas (e.g., antenna ports). The one or more transceivers 206a and 206b may convert received radio signals/channels, etc., from RF band signals into baseband signals in order to process received user data, control information, radio signals/channels, etc., using the one or more processors 202a and 202b. The one or more transceivers 206a and 206b may convert the user data, control information, radio signals/channels, etc., processed using the one or more processors 202a and 202b from the base band signals into the RF band signals. To this end, the one or more transceivers 206a and 206b may include (analog) oscillators and/or filters.

Figure 20:
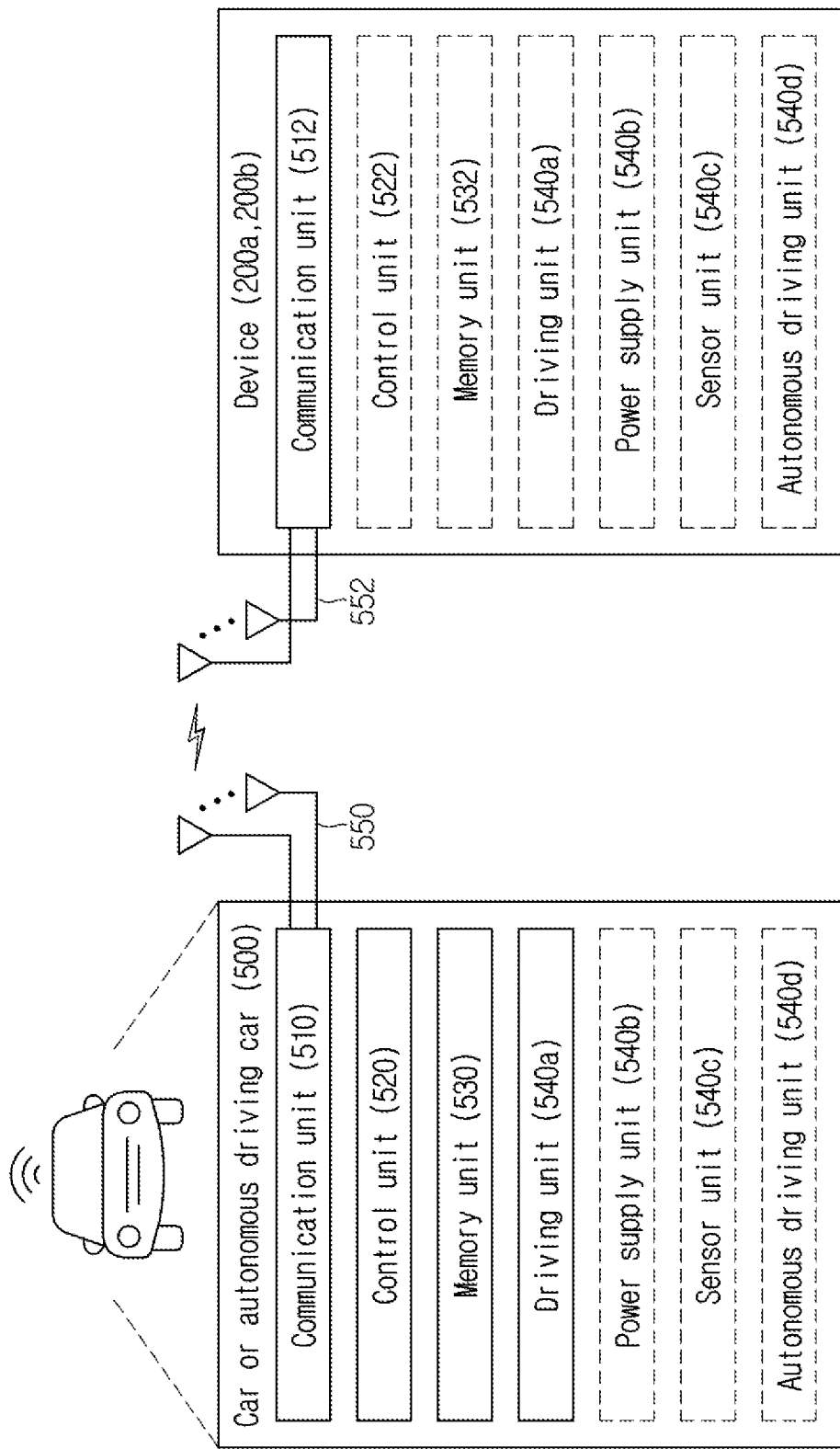
FIG. 20 illustrates an example of a vehicle or an autonomous vehicle according to an embodiment of the present disclosure.

FIG. 20 illustrates an example of a vehicle or an autonomous vehicle according to an embodiment of the present disclosure. FIG. 26 illustrates a vehicle or autonomous vehicle that is applied to the present disclosure. The vehicle or autonomous vehicle may be implemented by a mobile robot, a car, a train, a manned/unmanned aerial vehicle (AV), a ship and the like but is not limited to a vehicle form. An embodiment of FIG. 20 may be combined with various embodiments of the present disclosure.

Referring to FIG. 20, a vehicle or autonomous vehicle 600 may include an antenna unit 608, a communication unit 610, a control unit 620, a driving unit 640a, a power supply unit 640b, a sensor unit 640c, and an autonomous driving unit 640d. The antenna unit 650 may be configured as a part of the communication unit 610. Blocks 610/630/640a to 640d correspond to blocks 510/530/540 of FIG. 36 respectively, and a redundant description will be skipped.

The communication unit 610 may transmit and receive signals (e.g., data and control signals) to and from external devices such as other vehicles, base stations (e.g., base stations and road side units), and servers. The control unit 620 may perform various operations by controlling elements of the vehicle or the autonomous vehicle 100. The control unit 120 may include an electronic control unit (ECU). The driving unit 640a may cause the vehicle or autonomous vehicle 600 to drive on a road. The driving unit 640a may include an engine, a motor, a powertrain, a wheel, a brake, a steering device, etc. The power supply unit 640b may supply power to the vehicle or autonomous vehicle 600 and include a wired/wireless charging circuit, a battery, etc. The sensor unit 640c may acquire a vehicle state, ambient environment information, user information, etc. The sensor unit 640c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 640d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 610 may receive map data, traffic information data, etc., from an external server. The autonomous driving unit 640d may generate an autonomous driving path and a driving plan from the obtained data. The control unit 620 may control the driving unit 640*a* such that the vehicle or autonomous vehicle 600 may move along the autonomous driving path according to the driving plan (e.g., speed/direction control). In the middle of autonomous driving, the communication unit 610 may aperiodically/periodically acquire recent traffic information data from the external server and acquire surrounding traffic information data from neighboring vehicles. In the middle of autonomous driving, the sensor unit 640*c* may obtain a vehicle state and/or surrounding environment information. The autonomous driving unit 640*d* may update the autonomous driving path and the driving plan based on the newly obtained data/information. The communication unit 610 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

As the examples of the proposal method described above may also be included in one of the implementation methods of the present disclosure, it is an obvious fact that they may be considered as a type of proposal methods. In addition, the proposal methods described above may be implemented individually or in a combination (or merger) of some of them. A rule may be defined so that information on whether or not to apply the proposal methods (or information on the rules of the proposal methods) is notified from a base station to a terminal through a predefined signal (e.g., a physical layer signal or an upper layer signal).

The present disclosure may be embodied in other specific forms without departing from the technical ideas and essential features described in the present disclosure. Therefore, the above detailed description should not be construed as limiting in all respects and should be considered illustrative. The scope of the present disclosure should be determined by rational interpretation of the appended claims, and all changes within the equivalent scope of the present disclosure are included in the scope of the present disclosure. In addition, claims having no explicit citation relationship in the claims may be combined to form an embodiment or to be included as a new claim by amendment after filing.

INDUSTRIAL APPLICABILITY

The embodiments of the present disclosure are applicable to various radio access systems. Examples of the various radio access systems include a 3rd generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

What is claimed is:

1. A method of operating a terminal in a wireless communication system, the method comprising:
    receiving, by the terminal, at least one or more synchronization signal blocks (SSBs);
    selecting an SSB among the at least one or more SSBs based on a priority order; and
    transmitting a response message including a time difference value;
    receiving sidelink synchronization signal (SLSS) and physical broadcast channel (PBCH) based on the at least one or more SSBs;
    receiving control information based on a physical sidelink control channel (PSCCH); and
    receiving data based on a physical sidelink shared channel (PSSCH),
    wherein the time difference value is calculated based on the selected SSB,
    wherein the selected SSB is an SSB with a high priority based on a synchronization source,
    wherein transmission timing of the response message is determined based on the time difference value and a number of received SSBs,
    wherein a slot of the response message transmission timing is based on response period information, and
    wherein the response message includes receiving timing information.

2. The method of claim 1, wherein a resource block of the response message is randomly determined.

3. The method of claim 1, wherein the time difference value is a difference value between the selected SSB and remaining SSBs.

4. The method of claim 1, wherein the response message is a hybrid automatic repeat request (HARQ) feedback message.

5. The method of claim 1, wherein the slot of the response message transmission timing is determined in advance.

6. The method of claim 1, wherein the PBCH, which is mapped to the at least one or more SSBs, includes a master information block (MIB), and
    wherein the MIB includes used frequency range information and the response period information.

7. A method for operating a first terminal in a wireless communication system, the method comprising:
    transmitting, by the first terminal, a synchronization signal block (SSB) to a second terminal;
    receiving a response message including a time difference value;
    transmitting control information based on a physical sidelink control channel (PSCCH); and
    transmitting data based on a physical sidelink shared channel (PSSCH),
    wherein the SSB includes sidelink synchronization signal (SLSS) and physical broadcast channel (PBCH),
    wherein the response message includes the time difference value that is calculated based on the SSB,
    wherein the SSB is an SSB with a low priority based on a synchronization source, and
    wherein transmission timing of the response message is determined based on the time difference value and a number of SSBs received by the second terminal,
    wherein a slot of the response message transmission timing is based on response period information, and
    wherein the response message includes receiving timing information.

8. The method of claim 7, wherein a resource block of the response message is randomly determined.

9. The method of claim 7, wherein the time difference value is a time difference value between the SSB and another SSB received by the second terminal, and
    wherein the another SSB has a higher priority than the SSB.

10. The method of claim 7, wherein the response message is a hybrid automatic repeat request (HARQ) feedback message.

11. The method of claim 7, wherein the slot of the response message transmission timing is determined in advance.

12. The method of claim 7, wherein receiving timing is updated based on the response message.

13. A terminal in a wireless communication system, comprising:
a transceiver; and
a processor coupled with the transceiver,
wherein the processor controls:
the transceiver to receive at least one or more synchronization signal blocks (SSBs),
the terminal to select an SSB among the at least one or more SSBs based on a priority order,
the transceiver to transmit a response message including a time difference value,
the transceiver to receive sidelink synchronization signal (SLSS) and physical broadcast channel (PBCH) based on the at least one or more SSBs;
the transceiver to receive control information based on a physical sidelink control channel (PSCCH); and
the transceiver to receive data based on a physical sidelink shared channel (PSSCH),
wherein the time difference value is calculated based on the selected SSB,
wherein the selected SSB is an SSB with a high priority based on a synchronization source,
wherein transmission timing of the response message is determined based on the time difference value and a number of received SSBs,
wherein a slot of the response message transmission timing is based on response period information, and
wherein the response message includes receiving timing information.

14. A first terminal in a wireless communication system, comprising:
a transceiver; and
a processor coupled with the transceiver,
wherein the processor controls the transceiver to:
transmit a synchronization signal block (SSB) to a second terminal,
receive a response message including a time difference value,
transmit control information based on a physical sidelink control channel (PSCCH), and
transmit data based on a physical sidelink shared channel (PSSCH),
wherein the SSB includes sidelink synchronization signal (SLSS) and physical broadcast channel (PBCH),
wherein the response message includes the time difference value that is calculated based on the SSB,
wherein the SSB is an SSB with a low priority based on a synchronization source, and
wherein transmission timing of the response message is determined based on the time difference value and a number of SSBs received by the second terminal,
wherein a slot of the response message transmission timing is based on response period information, and
wherein the response message includes receiving timing information.

15. A device comprising at least one memory and at least one processor functionally coupled with the at least one memory,
wherein the at least one processor controls the device to:
receive at least one or more synchronization signal blocks (SSBs),
select an SSB among the at least one or more SSBs based on a priority order,
transmit a response message including a time difference value,
receive sidelink synchronization signal (SLSS) and physical broadcast channel (PBCH) based on the at least one or more SSBs;
receive control information based on a physical sidelink control channel (PSCCH); and
receive data based on a physical sidelink shared channel (PSSCH),
wherein the time difference value is calculated based on the selected SSB,
wherein the selected SSB is an SSB with a high priority based on a synchronization source, and
wherein transmission timing of the response message is determined based on the time difference value and a number of received SSBs,
wherein a slot of the response message transmission timing is based on response period information, and
wherein the response message includes receiving timing information.

16. A non-transitory computer-readable medium storing at least one instruction that is executable by a processor,
wherein the at least one instruction instructs the computer-readable medium to:
receive at least one or more synchronization signal blocks (SSBs),
select an SSB among the at least one or more SSBs based on a priority order, and
transmit a response message including a time difference value,
receive sidelink synchronization signal (SLSS) and physical broadcast channel (PBCH) based on the at least one or more SSBs;
receive control information based on a physical sidelink control channel (PSCCH); and
receive data based on a physical sidelink shared channel (PSSCH),
wherein the time difference value is calculated based on the selected SSB,
wherein the selected SSB is an SSB with a high priority based on a synchronization source,
wherein transmission timing of the response message is determined based on the time difference value and a number of received SSBs,
wherein a slot of the response message transmission timing is based on response period information, and
wherein the response message includes receiving timing information.

* * * * *